United States Patent
Maruyama et al.

(10) Patent No.: US 8,758,716 B2
(45) Date of Patent: Jun. 24, 2014

(54) COMPOSITION CONTAINING SINGLE-WALLED NANOTUBES

(75) Inventors: Shigeo Maruyama, Yokohama (JP); Masahito Yoshikawa, Nagoya (JP)

(73) Assignees: Toudai Tlo, Ltd., Tokyo (JP); Toray Industries, Inc, Tokyo (JP)

( * ) Notice: Subject to any disclaimer, the term of this patent is extended or adjusted under 35 U.S.C. 154(b) by 0 days.

(21) Appl. No.: 13/399,849

(22) Filed: Feb. 17, 2012

(65) Prior Publication Data

US 2012/0148839 A1 Jun. 14, 2012

Related U.S. Application Data

(62) Division of application No. 10/504,281, filed as application No. PCT/JP03/01468 on Feb. 13, 2003, now Pat. No. 8,128,900.

(30) Foreign Application Priority Data

Feb. 13, 2002 (JP) .................................. 2002-34758
Oct. 25, 2002 (JP) .................................. 2002-311111

(51) Int. Cl.
*D01F 9/12* (2006.01)
*D01F 9/127* (2006.01)

(52) U.S. Cl.
USPC .............. 423/447.1; 423/447.3; 977/742; 977/750; 977/842; 977/843

(58) Field of Classification Search
USPC ............... 423/447.1, 447.2, 447.3, 445 B; 977/742–754, 842–848; 428/367
See application file for complete search history.

(56) References Cited

U.S. PATENT DOCUMENTS

| 6,495,258 B1 | 12/2002 | Chen et al. ..................... 428/408 |
| 6,919,064 B2 | 7/2005 | Resasco et al. ............ 423/447.3 |
| 2002/0122766 A1* | 9/2002 | Lieber et al. ............... 423/447.3 |

FOREIGN PATENT DOCUMENTS

| JP | 5-116923 A | 5/1993 |
| JP | 8-100328 A | 4/1996 |
| JP | 10-203810 A | 8/1998 |
| JP | 10-273308 | 10/1998 |
| JP | 10-273308 A | 10/1998 |
| JP | 11-11917 A | 1/1999 |
| JP | 2003-81617 A | 3/2003 |
| KR | 10-2001-0099982 A | 11/2001 |
| WO | 98/39250 | 9/1998 |
| WO | 00/12886 | 3/2000 |
| WO | 00/17102 | 3/2000 |
| WO | 00/17102 A1 | 3/2000 |

(Continued)

OTHER PUBLICATIONS

Hafner, et al., Catalytic growth of single-wall carbon nanotubes from metal particles, Chemical Physics Letters 1998; 296: 195-202.*

(Continued)

*Primary Examiner* — Daniel C McCracken
(74) *Attorney, Agent, or Firm* — Kubovcik & Kubovcik

(57) ABSTRACT

An atmosphere of a carbon source comprising an oxygenic compound is brought into contact with a catalyst with heating to yield single-walled carbon nanotubes. The carbon source comprising an oxygenic compound preferably is an alcohol and/or ether. The catalyst preferably is a metal. The heating temperature is preferably 500 to 1,500° C. The single-walled carbon nanotubes thus obtained contain no foreign substances and have satisfactory quality with few defects.

17 Claims, 18 Drawing Sheets

(56) References Cited

FOREIGN PATENT DOCUMENTS

| WO | 00/17105 | 3/2000 |
|---|---|---|
| WO | 00/73205 | 12/2000 |
| WO | 00/73205 A1 | 12/2000 |
| WO | 01/12886 | 2/2001 |

OTHER PUBLICATIONS

Bronikowski, et al., Gas-phase production of carbon single-walled nanotubes from carbon monoxide via the HiPco process: A parametric study, J. Vac. Sci. Technol. A 2001; 19(4): 1800-1805.*

Maruyama, Shigeo et al., "Low-temperature synthesis of high-purity single-walled carbon nanotubes from alcohol," *Chemical Physics Letters* 360 (2002), pp. 229-234.

Rao, A.M. et al., "Diameter-Selective Raman Scattering from Vibrational Modes in Carbon Nanotubes", *Science*, vol. 275, Jan. 10, 1997, pp. 187-191.

Dai, Hongjie et al., "Single-walled nanotubes produced by metal-catalyzed disproportionation of carbon monoxide", *Chemical Physics Letters* 260 (1996), pp. 471-475.

Libera, J. et al. "Hydrothermal synthesis of graphite tubes using Ni catalyst," *Carbon*, vol. 39, No. 9, Aug. 2001, pp. 1307-1318.

Bronikowski, et al., Gas-phase production of carbon single-walled nanotubes from carbon monoxide via the HiPco process: A parametric study, J. Vac. Sci. Technol. A 2001; 19($): 1800-1805.

Pinheiro, et al., Effect of hydrogen on the orientation of carbon layers in deposits from the carbon monoxide disproportionation reaction over Co/Al2O3 catalysts, Carbon 2000; 38: 1469-1479.

Choi, et sl.,Controlling the diameter, growth rate, and density of verically aligned carbon nanotubes synthesized by microwave plazma-enhanced chemical vapor deposition, Allied Physics Letters 2000; 76(17): 2367-2369.

Kataura, et al., Diameter control of single-walled carbon nanotubes, Carbon 2000; 38: 1961-1967.

Morrison & Boyd, Organic Chemistry, p. 237-238 (6th ed., Prentice-Hall 1992).

Wu, et al., Hydrogen uptake by carbon nanotubes, International Jurnal of Hydrogen Energy 2000; 25: 261-265.

Hafner, et al., Catalytic growth of single-wall carbon nanotubes from metal particles, Chemical Physics Letters 1998; 196: 195-202.

Pham-Huu, et al., Large scale synthesis of caron nanofibers by catalytic decomposition of ethane on nickel nanoclusters decorating carbon nanotubes, Phys. Chem. Chem. Phys. 2002; 4: 514-521.

* cited by examiner

COMPOSITION CONTAINING SINGLE-WALLED NANOTUBES

This application is a division of application Ser. No. 10/504,281, filed Aug. 11, 2004, now U.S. Pat. No. 8,128,900 which is a 371 of international application PCT/JP03/01468, filed Feb. 13, 2003, which claims priority based on Japanese Patent Application Nos. 2002-34758 and 2002-311111, filed Feb. 13, 2002, and Oct. 25, 2002, respectively, and which are incorporated herein by reference.

TECHNICAL FIELD

The present invention relates to a process for producing a single-walled carbon nanotube and to the single-walled carbon nanotube produced thereby, as well as to a composition containing the single-walled carbon nanotube. More particularly, the present invention relates to a process for producing a high quality single-walled carbon nanotube with few defects, to the single-walled carbon nanotube produced thereby, as well as to a composition containing the single-walled carbon nanotube,

BACKGROUND ART

Recently, carbon nanotubes (hereinafter also referred to as "CNTs" for short) are widely researched and developed. Among the CNTs, single-walled CNTs are applicable to wide variety of uses because of, for example, their shape, electronic property, adsorption characteristics, mechanical characteristics and the like, so that their developments are strongly demanded.

Conventionally, an arc discharge method, a laser ablation method, and a CVD method are known as typical process for producing CNTs.

Among these processes, the arc discharge method is a method in which arc discharge is conducted between carbon rods under an argon or hydrogen atmosphere having a pressure little lower than atmospheric pressure to generate multi-walled CNTs in the deposits on the cathode. In this case, by performing the arc discharge using carbon rods containing a catalyst such as Ni/Y, single-walled CNTs can be generated on the inner surface of the vessel. The arc discharge method has an advantage in that relatively good quality CNTs with few defects can be generated. On the other hand, however, it has problems in that i) amorphous carbon is simultaneously produced, ii) the cost is high, iii) it is not suited for synthesis in large scale, and so on.

The laser ablation method is a method in which CNTs are generated by irradiating a carbon containing a catalyst such as Ni/Co with a strong pulsed light such as YAG laser under an atmosphere at a high temperature between 900° C. to 1300° C. Although the method has advantages in that CNTs with a relatively high purity can be obtained, and the diameter of the tubes can be controlled by changing the conditions, the yield is small and employment of this method in an industrial scale is said to be difficult.

The CVD (Chemical Vapor Deposition) method is a method in which CNTs are generated by bringing a carbon compound serving as a carbon source into contact with catalyst metal particles at 500° C. to 1200° C. The method has variations in the type of the metal catalyst, the arrangement thereof, and in the type of the carbon compound, and both multi-walled CNTs and single-walled CNTs can be synthesized by changing the conditions. Further, by arranging the catalyst on a substrate, multi-walled CNTs aligned perpendicularly to the surface of the substrate can also be obtained.

Dai et al. disclosed a CVD method by which single-walled CNTs can be obtained using carbon monoxide as a raw material and iron carbonyl as a catalyst (Chemical Physics Letters, 260, 471-475, (1996)). This method is best suited for large scale synthesis because a raw material in the form of gas can be supplied, and the ratio of single-walled CNTs is said to be relatively high. However, this method has a disadvantage in that the synthesized single-walled CNTs generally have many defects. Further, to generate single-walled CNTs, a temperature of 900° C. or higher is required. Still further, since highly toxic carbon monoxide and iron carbonyl are used, the method is problematic from the viewpoint of safety. Although a number of other production processes for producing single-walled CNTs by CVD method have been proposed, it was found by actual trials that each of them has a problem in that the percentage of the single-walled CNTs in the CNTs is as small as 20% or lower.

DISCLOSURE OF THE INVENTION

An object of the present invention is to provide a process for producing single-walled carbon nanotubes in which the contamination of foreign substances such as multi-walled carbon nanotubes, amorphous carbon, carbon nanoparticles and the like is small, or which is substantially free from such a contamination, which has a high quality and in which the defects are few.

Another object of the present invention is to provide a process for producing single-walled carbon nanotubes, by which high quality single-walled carbon nanotubes with few defects can be produced safely in a large amount.

Still another object of the present invention is to provide a high quality single-walled carbon nanotube with few defects and to provide a composition containing the high quality single-walled carbon nanotube.

The process for producing single-walled carbon nanotubes according to the present invention achieving the above-described objects is characterized in that an atmosphere of a carbon source comprising an oxygen-containing compound or a mixture of the oxygen-containing compound and a carbon-containing compound is brought into contact with a catalyst with heating to produce single-walled carbon nanotubes.

Another process for producing single-walled carbon nanotubes according to the present invention is characterized in that a carbon source comprising an oxygen-containing compound or a mixture of the oxygen-containing compound and a carbon-containing compound is brought into contact with a catalyst with heating to produce carbon nanotubes such that the carbon nanotubes are adhered to one part of the catalyst, wherein the carbon nanotubes have a content of single-walled carbon nanotubes of not less than 95%.

Another process for producing single-walled carbon nanotubes according to the present invention is characterized in that an atmosphere comprising a carbon source comprising an oxygen-containing compound or a mixture of the oxygen-containing compound and a carbon-containing compound is brought into contact with a catalyst with heating to yield single-walled carbon nanotubes such that the carbon nanotubes are adhered to one part of the catalyst, wherein when the resulting composition is observed using a transmission electron microscope at a magnification of not less than ×1,000,000, at least 30% of a 100 nm×100 nm viewing area is occupied by the carbon nanotubes, and wherein the carbon nanotubes have a content of single-walled carbon nanotubes of not less than 95%.

By the present invention described above, single-walled carbon nanotubes in which the contamination of foreign substances such as multi-walled carbon nanotubes, amorphous carbon, carbon nanoparticles and the like is small, or which is substantially free from such a contamination, which has a high quality and in which the defects are few, can be generated. To promote such an effect, an oxygen-containing organic compound, more preferably, an alcohol and/or ester is used as the oxygen-containing compound serving as the carbon source, which is used as the raw material. As the catalyst, a metal herein below described is preferably used. More preferably, the catalyst is used such that it is supported on a support material. As for the heating temperature, it is preferred to employ a temperature of not lower than 500° C.

More concretely, the following plurality of production processes may be exemplified as the process for producing single-walled carbon nanotubes according to the present invention.

The first exemplified process for producing single-walled carbon nanotubes comprises the steps of:
a) arranging a catalyst in a reactor; and
b) producing carbon nanotubes by bringing at least one kind of oxygen-containing organic material selected from the group consisting of alcohols and ethers into contact with the catalyst under a pressure or partial pressure of the oxygen-containing organic material of 0.1 to 200 Torr (0.01 to 27 kPa) and at a temperature of 500 to 1500° C.;
wherein the carbon nanotubes are produced such that they are adhered to one part of the catalyst and wherein the carbon nanotubes have a content of single-walled carbon nanotubes of not less than 95%.

The second exemplified process for producing single-walled carbon nanotubes comprises the steps of:
a) arranging a catalyst in a reactor; and
b) producing carbon nanotubes by bringing at least one kind of oxygen-containing organic material selected from the group consisting of alcohols and ethers into contact with the catalyst under a pressure or partial pressure of the oxygen-containing organic material of 0.1 to 200 Torr (0.01 to 27 kPa) and at a temperature of 500 to 1500° C.;
wherein the carbon nanotubes are produced such that they are adhered to one part of the catalyst, wherein when the resulting composition is observed using a transmission electron microscope at a magnification of not less than ×1,000,000, at least 30% of a 100 nm×100 nm viewing area is occupied by the carbon nanotubes, and wherein the carbon nanotubes have a content of single-walled carbon nanotubes of not less than 95%.

The third exemplified process for producing single-walled carbon nanotubes comprises the steps of:
a) making a catalyst exist in a reactor;
b) producing carbon nanotubes by bringing at least one kind of oxygen-containing organic material selected from the group consisting of alcohols and ethers into contact with the catalyst at a temperature of 500 to 1500° C.; and
c) recovering the oxygen-containing organic material after the step b) and reusing the oxygen-containing organic material in the step b).

The fourth exemplified process for producing single-walled carbon nanotubes comprises the steps of:
a) arranging a catalyst in a reactor;
b) flowing an inert gas and/or a reducing gas into the reactor while the inside of the reactor is heated up to a maximum temperature between 500° C. and 1500° C.;
c) evacuating the inside of the reactor after reaching the maximum temperature; and
d) flowing at least one kind of oxygen-containing organic material selected from the alcohols and ethers into the reactor maintained at the maximum temperature so that its pressure or partial pressure is 0.1 to 200 Torr (0.01 to 27 kPa), and yielding carbon nanotubes by bringing the matter into contact with the catalyst so that the carbon nanotubes are adhered to one part of the catalyst;
wherein the carbon nanotubes yielded such that they are adhered to one part of the catalyst have a content of single-walled carbon nanotubes of not less than 95%.

By these processes of the present invention, a composition containing single-walled carbon nanotubes satisfying the following characteristics can be obtained:
a) a peak position of the linear differential curve of weight decrease by burning is obtained at 500° C. or higher when a composition containing the single-walled carbon nanotubes is thermally analyzed at a temperature rising rate of 5° C./min in the air, and the half value width of the peak is smaller than 170° C.;
b) when the composition is observed with a transmission electron microscope at a magnification of not less than ×1,000,000, the single-walled carbon nanotubes are observed; and
c) when the composition containing single-walled carbon nanotubes is observed by the resonance Raman scattering measurement (an excitation wavelength is 488 nm);
1) G band can be observed in the vicinity of 1590 cm$^{-1}$ and the G band is split; and
2) a peak height in the vicinity of 1350 cm$^{-1}$ (D band) is not higher than ⅓ of a peak height in the vicinity of 1590 cm$^{-1}$.

A single-walled carbon nanotube-containing composition satisfying the following characteristics can also be obtained:
a) when the composition containing the single-walled carbon nanotubes is thermally analyzed with a temperature rising rate of 5° C./min in the air, a peak position of a linear differential curve of weight decrease by burning is observed at a temperature of 570° C. or higher, and the half value width of the peak is smaller than 80° C.;
b) when an electron micrograph of the composition containing single-walled carbon nanotubes is taken with a transmission electron microscope at a magnification of not less than ×1,000,000, at least 10% of the viewing area sizing 100 nm×100 nm is occupied by the carbon nanotubes, and not less than 70% thereof is the single-walled carbon nanotubes.

BEST MODE OF EMBODIMENTS FOR CARRYING OUT THE INVENTION

Figure 1:
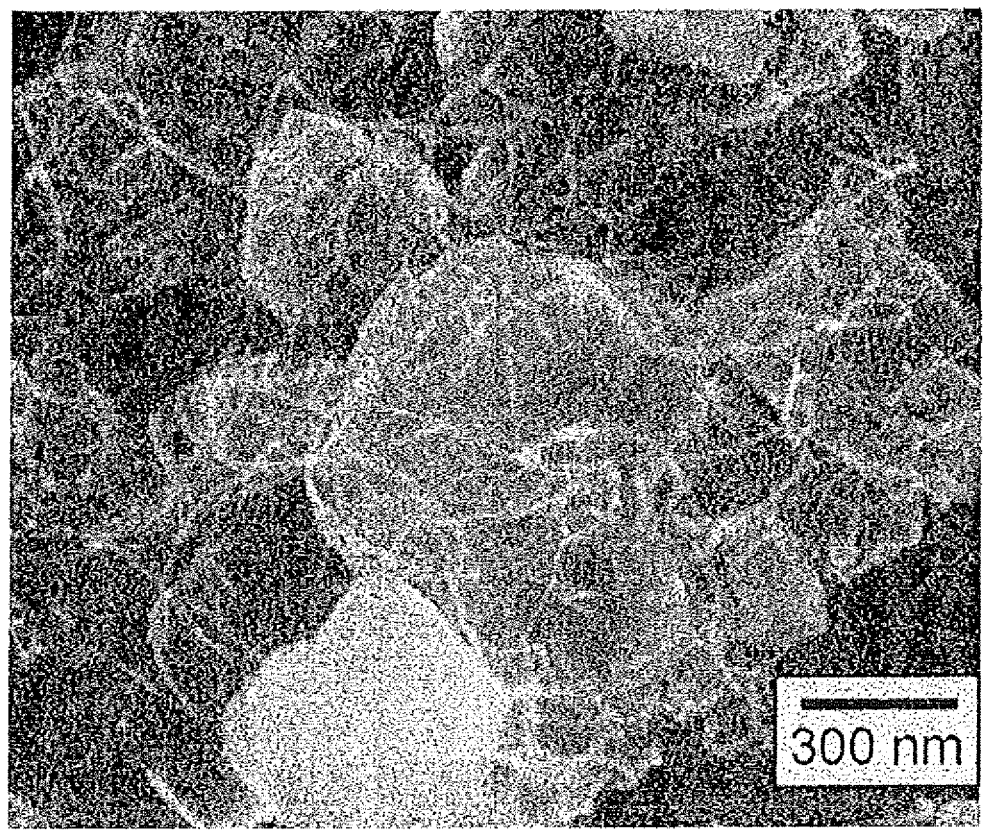
FIG. 1 shows a SEM image of the single-walled carbon nanotubes obtained in Example 1.

The fundamental constitution of the process for producing single-walled carbon nanotubes according to the present invention is that an atmosphere of a carbon source comprising an oxygen-containing compound or a mixture of an oxygen-containing compound and a carbon-containing compound is brought into contact with a catalyst under heat to thereby generate single-walled carbon nanotubes. Through this step, good quality single-walled carbon nanotubes with few defects can be obtained.

In the present invention, as the raw material, a carbon source comprising an oxygen-containing compound is used, or a mixture of an oxygen-containing compound and a carbon-containing compound is used. The former raw material comprises a compound containing both oxygen and carbon in a single molecule, while the latter raw material is a mixture of two or more molecules of a compound containing oxygen and a compound containing carbon. Use of the former compound containing oxygen and carbon in a single molecule is preferred, and use of an oxygen-containing organic compound is more preferred.

While carbon monoxide is a compound containing oxygen and carbon in a single molecule, since it is not an organic compound, it is not included in oxygen-containing organic compounds. Further, since carbon monoxide has a problem in safety, it is not suited as a raw material used in the present invention. However, it is acceptable that carbon monoxide (CO) be generated as an intermediate.

The type of the organic compound containing oxygen in the molecule is not restricted, and alcohols and/or ethers are preferred. The type of alcohols is not restricted, and alcohols having 1 to 10 carbon atoms are preferred because they are easily vaporized. The alcohols are not restricted to those having only one OH group, and those having 2 or more OH groups may also be employed. The type of ethers is not restricted, and ethers having 1 to 10 carbon atoms are preferred because they are easily vaporized. The ethers are not restricted to those having only one —O— group, and those having 2 or more —O— groups may also be employed.

Examples of alcohols which may be employed include, but not limited to, methanol, ethanol, n-propanol, iso-propanol, n-butanol, iso-butanol, sec-butanol, tert-butanol, n-pentanol, iso-pentanol, n-amylalcohol, iso-amylalcohol, n-hexanol, n-heptanol, n-octanol, n-nonanol, n-decanol and the like.

Examples of ethers include, but not limited to, dimethyl ether, diethyl ether, methyl ethyl ether and the like.

It is preferred to use at least one kind among methanol, ethanol, n-propanol and iso-propanol as the alcohols and ethers, although that depends on the catalyst used in the production process of the present invention.

In the "mixture of an oxygen-containing compound and a carbon-containing compound" used in the present invention, the oxygen-containing compound is as described above. Examples of the carbon-containing compound include hydrocarbons such as methane, ethane, ethylene, acetylene, hexane, benzene, xylene, and toluene. Compounds containing an atom other than carbon, such as pyridine and amine may also be used. Examples of the mixture include mixtures of water and a hydrocarbon(s) such as acetylene, and mixtures of NOX, SOX and a hydrocarbon(s) such as acetylene.

When the above-described carbon source comprising the oxygen-containing compound or the mixture of an oxygen-containing compound(s) and a carbon-containing compound(s) used as the raw material is supplied to the reaction zone, it is supplied as an atmosphere in the form of gas. Such an atmosphere can be prepared by using the vapor of the compound in case of liquid compounds, and a flow can be made by evacuation by a vacuum pump or by using a carrier gas.

In the present invention, the catalyst is arranged such that it contacts the above-described atmosphere of the raw material in the reaction zone with heating temperature. The catalyst may be arranged stationarily in the reaction zone, or may be flown so as to contact the atmospheric gas of the raw material. The stationary arrangement is employed when the single-walled carbon nanotubes are produced batch wise. In cases where the single-walled carbon nanotubes are continuously produced, it is preferred to flow the catalyst. The term "flow" herein means to remove the catalyst by which the single-walled carbon nanotubes were generated, after supplying the catalyst to the reaction zone and after generating the single-walled carbon nanotubes, that is, means to make the catalyst exist such that it moves in the reaction zone.

The atmosphere of the source gas is brought into contact with the catalyst with heating to generate the single-walled carbon nanotubes. The lower limit of the heating temperature is, although depending on the atmosphere and the catalyst, 500° C., preferably 550° C., more preferably 650° C. That is, the heating temperature is not lower than 500° C., preferably not lower than 550° C., more preferably not lower than 650° C. By the production process of the present invention, single-walled carbon nanotubes can be synthesized at such a relatively low temperature. Therefore, even on a material with a relatively low heat-resistance, for example, even on a silicon substrate after wiring, the single-walled carbon nanotubes can be synthesized on the substrate and wiring by the single-walled carbon nanotubes can be attained.

The upper limit of the heating temperature is, although depending on the atmosphere of the source gas and the catalyst, 1500° C., preferably 1000° C., more preferably 900° C. That is, the heating temperature is not higher than 1500° C., preferably not higher than 1000° C., more preferably not higher than 900° C.

By controlling the heating temperature, the diameter of the generated single-walled carbon nanotubes can be controlled. Although depending on the catalyst used and so on, in general, employing a lower heating temperature results in single-walled carbon nanotubes having smaller diameter, and conversely, employing a higher heating temperature results in single-walled carbon nanotubes having larger diameter. The single-walled carbon nanotubes with smaller diameter has better electron emission characteristics, and more easily show the effect of addition when made into a composite material. Since the conventionally known process could yield the single-walled carbon nanotubes only at high temperature, the catalyst particles are agglomerated and grow, so that thin single-walled carbon nanotubes could not be obtained.

By the production process of the present invention, by employing a carbon source comprising an oxygen-containing compound, preferably an oxygen-containing organic compound such as an alcohol(s) and/or ether(s), single-walled carbon nanotubes can be synthesized at a relatively low temperature. Especially, single-walled carbon nanotubes with a small diameter can be synthesized. Further, by the production process of the present invention, generation of thick carbon nanotubes can be suppressed.

As the catalyst to be used in the present invention, any of the known catalysts conventionally used in the synthesis of carbon nanotubes may be employed. For example, the catalysts conventionally used in the (1) arc discharge method, (2) laser ablation method, (3) CVD method and the like, which are representative production processes of the carbon nanotubes, may be employed. More specifically, metal catalysts supported on a support material and the like may be employed.

Examples of the metal catalysts include Fe, Co, Ni, Mo, Pt, Pd, Rh, Ir, Y, La, Ce, Pr, Nd, Gd, Tb, Dy, Ho, Er, Lu and the like. Preferred examples include Fe, Co, Ni, Mo, Pt, Pd, Rh, Ir and Y; Ce, Pr, Nd, Gd, Tb, Dy, Ho and Er; and Lu and the like. Combinations thereof, for example, Fe/Co, Ni/Co, Fe/Mo and Co/Mo; combinations of the oxide(s) of the metals and the metals; and combinations of the oxides of the metals may also be employed.

Examples of the support material of the metal catalyst include silica, alumina, zeolite, MgO, zirconia, titania and the like. Needless to say, materials other than these materials may also be used as the support material. For example, a silicon substrate after wiring may be used as the support material. In this case, by supporting an appropriate metal catalyst on a desired site(s) of the silicon substrate, synthesis of the single-walled carbon nanotubes on the substrate and wiring through the single-walled carbon nanotubes can be attained.

The method for supporting the metal on the support material is not restricted. It can be attained by dissolving a metal salt in a solvent such as water or alcohol, impregnating the support material with the solution, mixing, in some cases, the resultant by, for example, stirring, and drying the resultant. By heating the dried material, the salt supported thereon is decomposed to become the catalyst used in the present invention. Although the heating conditions are not restricted, the temperature is not lower than the decomposition temperature of the metal salt. The atmosphere in the heating is also not restricted, and preferably the heating is carried out under an inert gas, reducing gas, inert gas containing a reducing gas or under vacuum. Preferably, the heating is carried out under an inert gas or under an inert gas containing a reducing gas.

The support material is not restricted as long as it can withstand the reaction temperature, and MgO and zeolite are preferred. MgO is preferred because it can be decomposed easily later and the catalyst support material can be easily removed by an acid treatment. Zeolite is preferred because the yield of the single-walled carbon nanotubes is high, although the reason therefor is not clear. By using a zeolite, a higher yield of the carbon nanotubes can be attained than using other support materials.

In the present invention, zeolite is a crystalline inorganic oxide having pores of molecular size. The term "molecular size" herein means the range of the size of molecules existing on the earth, and generally means the range of about 0.2 nm to 2 nm. More specifically, zeolite means a crystalline microporous substance composed of a crystalline silicate, crystalline aluminosilicate, crystalline metallosilicate, crystalline metallo aluminosilicate, crystalline aluminophosphate, crystalline metallo-alumino-phosphate or the like.

The type of the crystalline microporous substance composed of a crystalline silicate, crystalline aluminosilicate, crystalline metallosilicate, crystalline metalloaluminosilicate, crystalline aluminophosphate or crystalline metalloaluminophosphate is not restricted, and examples thereof are the crystalline inorganic porous materials having the structure described in Atlas of Zeolite Structure types (W. M. Meier, D. H. Olson, Ch. Baerlocher, Zeolites, 17(1/2), 1996).

The zeolites which may be used in the present invention are not restricted to those described in this reference, and the zeolites having novel structures consecutively synthesized in recent years may also be used. Preferred structures are FAU-type, MFI-type, MOR-type, BEA type, LTL-type, LTA-type, and FER-type which are easily available, but the structures are not restricted thereto. In view of availability, FAU-type, MFI-type, MOR-type, BEA type, LTL-type, LTA-type, and FER-type of crystalline aluminosilicate are preferred.

It is known to produce multi-walled carbon nanotubes by bringing zeolite as a catalyst support material which supports a metal thereon into contact with a hydrocarbon at a high temperature (Chemical Physics Letters 303, 117-124 (1999)). It is also known that single-walled carbon nanotubes are obtained by bringing acetylene into contact with zeolite supporting a metal at a temperature higher than 800° C., although the percentage of the generated single-walled carbon nanotubes is very small, and that single-walled carbon nanotubes are not obtained at a temperature lower than 800° C. (Abstracts of the 21st Fullerene General Symposium, July, 2001).

In contrast, according to the present invention, it was discovered that single-walled carbon nanotubes can be obtained with a high purity, high selectivity and high yield by bringing an oxygen-containing organic compound such as ethanol or the like into contact with zeolite supporting a metal catalyst. The differences from the known production process of single-walled carbon nanotubes using zeolite reside in that (1) the source gas is an oxygen-containing organic compound, (2) the single-walled carbon nanotubes can be produced at a reaction temperature of not higher than 800° C., and (3) the major component of the generated carbon nanotubes is single-walled carbon nanotubes and the quality and purity thereof are extremely high.

Although the production process per se is a combination of known techniques, it is noteworthy that its effects are unexpectedly superior. In the present invention, since the single-walled carbon nanotubes can be produced at a low temperature of not higher than 800° C., it is not necessary to use a heat-resistant zeolite. For example, any range of crystalline aluminosilicates can be used.

For example, in crystalline aluminosilicate zeolites, those having poor heat-resistance are included, but they may be used in the production process of the present invention without any problem. Although the reason why the yield is highest when a metal supported on zeolite is used as the catalyst is not clear at present, it is thought that the metal is successfully dispersed utilizing the uniform pores which the zeolite has. Therefore, in cases where greater importance is given to the yield, it is preferred that the outer surface of the zeolite have a number of pores. That is, the zeolites having two-dimensional and/or three-dimensional pore structures are preferred. Although smaller crystal size is preferred, it is expected that if the crystal size is too small, ease of handling may be poor. Any range of zeolite commercially available, or used or synthesized in researches can be used without a heavy restriction.

The silica to alumina ratio of the crystalline aluminosilicate is not restricted, and is preferably within the range of 2 to 500. Since no restriction is posed by the reaction temperature, high heat-resistance which was hitherto required in the production of single-walled carbon nanotubes is not required. Therefore, (1) crystalline alumino-phosphate, (2) crystalline aluminosilicate zeolite, (3) dealuminized zeolite that is a crystalline aluminosilicate from which aluminium is removed (high silica-type crystalline aluminosilicate subjected to dealuminization treatment), which are generally thought to have poor heat-resistance, may be used. Although it is assumed that these zeolites are not preferred for the production of carbon nanotubes at a high temperature because of the poor heat-resistance and large amount of structural defects, they may be satisfactorily used in the production process of the present invention because single-walled carbon nanotubes can be synthesized at a low temperature. Since the polar sites in the alumino-phosphate, the polar sites in the aluminosilicate, and the defect sites formed by elimination of aluminum in the high silica-type crystalline aluminosilicate have a high affinity with the metal salt, these zeolites may preferably be employed.

The metal catalyst alone may be used without using a support material. For example, a solution of the metal salt and/or organic metal compound in alcohol or the like may be sprayed from the upper portion of a reaction tube so as to make the solution pass through the reaction zone, thereby making the solution exist in the reaction zone. Specific examples of the organic metal compound include ferrocene, cobaltcene and the like.

However, in order to prevent agglutination of catalyst particles, using a catalyst supported on a support material is preferred.

In the present invention, a carbon source (source gas) comprising an oxygen-containing compound is brought into contact with a catalyst. The atmosphere of the gas has a pressure or partial pressure of 0.1 to 200 Torr (0.01 to 27 kPa), preferably 0.2 to 50 Torr (0.02 to 6.7 kPa), more preferably 1 to 20 Torr (0.13 to 2.7 kPa), still more preferably 1 to 10 Torr (0.13 to 1.3 kPa). If the partial pressure is high, the amount of amorphous carbon adhered to the single-walled carbon nanotubes is large. On the other hand, if the partial pressure is too low, the yield of the single-walled carbon nanotubes is small. The overall pressure may be any of reduced pressure, normal pressure and increased pressure. It is acceptable that an inert gas and the like other than the raw material gas co-exists. The pressure is not restricted, and normal pressure or reduced pressure is preferred in view of ease of operation and of the small amount of amorphous carbon adhered to the single-walled carbon nanotubes.

It is preferred to form a flow of the raw material gas. More specifically, it is preferred to form a flow of the carbon source (source gas) comprising the oxygen-containing compound by using a vacuum pump, or by using a carrier gas.

The carrier gas is a gas for forming a gas flow. Although not restricted, it is preferred to mainly use an inorganic gas. Although not restricted as long as the carrier gas is an inorganic gas, use of an inert gas is especially preferred because it does not influence on the reaction. For example, nitrogen, helium, argon or the like may preferably be employed. To cause a source gas to flow at a low partial pressure of the source gas, it is preferred to carry out the reaction under reduced pressure using a vacuum pump. It is preferred to trap the raw material gas by cooling before the pump, and to reuse the trapped liquid as the source of the raw material gas or as an energy source by burning it. This is also true when the vapor of the raw material is flown by a carrier gas.

More specifically, the present invention provides the following production processes of single-walled carbon nanotubes, The first production process comprises the steps of:
a) arranging a catalyst in a reactor; and
b) producing carbon nanotubes by bringing at least one kind of oxygen-containing organic material selected from the group consisting of alcohols and ethers into contact with the catalyst under a pressure or partial pressure of the oxygen-containing organic material of 0.1 to 200 Torr (0.01 to 27 kPa) and at a temperature of 500 to 1500° C.;
wherein the carbon nanotubes are produced such that they are adhered to one part of the catalyst and wherein the carbon nanotubes have a content of single-walled carbon nanotubes of not less than 95%.

The second process for producing single-walled carbon nanotubes comprises the steps of:
a) arranging a catalyst in a reactor; and
b) producing carbon nanotubes by bringing at least one kind of oxygen-containing organic material selected from the group consisting of alcohols and ethers into contact with the catalyst under a pressure or partial pressure of the oxygen-containing organic material of 0.1 to 200 Torr (0.01 to 27 kPa) and at a temperature of 500 to 1500° C.;
wherein the carbon nanotubes are produced so as to adhere to one part of the catalyst, wherein when the resulting composition is observed using a transmission electron microscope at a magnification of not less than ×1,000,000, at least 30% of a 100 nm×100 nm viewing area is occupied by the carbon nanotubes, and wherein the carbon nanotubes have a content of single-walled carbon nanotubes of not less than 95%.

The third process for producing single-walled carbon nanotubes comprises the steps of:

a) making a catalyst exist in a reactor;
b) producing carbon nanotubes by bringing at least one kind of oxygen-containing organic material selected from the group consisting of alcohols and ethers into contact with the catalyst at a temperature of 500 to 1500° C.; and
c) recovering the oxygen-containing organic material after the step b) and reusing the oxygen-containing organic material in the step b).

The fourth process for producing single-walled carbon nanotubes comprises the steps of:

a) arranging a catalyst in a reactor;
b) flowing an inert gas and/or a reducing gas into the reactor while the inside of the reactor is heated up to a maximum temperature between 500° C. and 1500° C.;
c) evacuating the inside of the reactor after reaching the maximum temperature; and
d) a step of flowing at least one kind of oxygen-containing organic material selected from the alcohols and ethers flow into the reactor maintained at the maximum temperature so that its pressure or partial pressure is 0.1 to 200 Torr (0.01 to 27 kPa), and producing carbon nanotubes by bringing the matter into contact with the catalyst so that the carbon nanotubes are adhered to one part of the catalyst; wherein the carbon nanotubes produced such that the carbon nanotubes are adhered to one part of the catalyst have a content of single-walled carbon nanotubes of not less than 95%.

Although the mechanism of the production process of the present invention has not yet been clarified completely, it is thought as follows: That is, it is thought that the carbon source comprising an oxygen-containing compound, preferably an oxygen-containing organic compound, especially preferably an alcohol, ethanol or ether, generates OH radicals or oxygen radicals in the vicinity of the catalyst under the heating temperature, and the generated OH radicals or oxygen radicals react with carbon atoms having dangling bond.

That is, the carbon atoms which became a part of the stable single-walled carbon nanotubes are retained, while the amorphous carbon which failed to become a part of the single-walled carbon nanotubes is attacked by OH radicals or oxygen radicals and removed. Thus, since generation and purification of the single-walled carbon nanotubes are simultaneously carried out, single-walled carbon nanotubes can be generated very selectively. That is, in the reaction according to the present invention, this mechanism can be attained by virtue of the existence of the carbon source comprising an oxygen-containing compound. Alcohols and/or ethers are preferably employed because both of the generation and purification can be attained simultaneously.

As a process with which the generation of amorphous carbon is small, there is a process in which CO gas at a high temperature and high pressure is used. In this case, annealing of the nanotubes is carried out at a very high temperature. In contrast, by the production process of the present invention, synthesis can be attained at a relatively low temperature without the need of annealing.

Although the reason therefor is not clear, the fact that the carbon source comprising an oxygen-containing compound contains hydrogen is thought to be important. It is assumed that the hydrogen gas generated by decomposition of the carbon source comprising the oxygen-containing compound upon contact between the catalyst and the carbon source activates the catalyst and removes the unnecessary oxygen so as to exhibit an effect such as lowering the reaction temperature. Thus, use of a raw material containing oxygen, carbon and hydrogen is preferred, and as a preferred raw material, oxygen-containing organic compounds may be exemplified. As a generic concept, it is also within the scope of the present invention to supply a carbon source, oxygen source and hydrogen source separately.

Catalyst is adhered to one part of each carbon nanotube obtained by the production process of the present invention. When a composition containing the carbon nanotubes is observed with a transmission electron microscope (TEM) at a magnification of not less than ×1,000,000, a photograph in which at least 10% of the viewing area sizing 100 nm×100 nm is occupied by the carbon nanotubes, and not less than 70% thereof is the single-walled carbon nanotubes is obtained. That is, the single-walled carbon nanotubes can be obtained at a high purity and high yield.

By the present invention, by selecting the conditions, single-walled carbon nanotubes with even higher purity can be obtained. When a composition containing the carbon nanotubes is observed with a transmission electron microscope at a magnification of not less than ×1,000,000, a photograph in which at least 30% of the viewing area sizing 100 nm×100 nm is occupied by the carbon nanotubes, and not less than 95% thereof is the single-walled carbon nanotubes is obtained (see FIG. 2).

The single-walled carbon nanotubes generated in the conventional production processes are nothing more than mixtures with amorphous carbon or with a large amount of multi-walled carbon nanotubes, or nothing more than those in which the catalyst metal is seen not only on one end of each single-walled carbon nanotube but also everywhere other than the end. Therefore, a transmission electron micrograph mentioned above cannot be obtained. Observation with a transmission electron microscope at a magnification of ×1,000,000 also means to take a photograph at a magnification of ×200,000 and then the photograph is enlarged 5 times. As the transmission electron microscope, a high resolution transmission electron microscope is preferred.

In the single-walled carbon nanotubes obtained by the production process of the present invention, there are few defects or no defects in the single wall, so that they have a very high quality. The defects in the single-walled carbon nanotubes can be observed with a transmission electron microscope. The sites at which a wall of the single-walled carbon nanotubes is interrupted are defined as the defects.

The fewness of the defects can also be defined as follows: That is, when the composition containing the single-walled carbon nanotubes obtained by the production process of the present invention is subjected to a thermal analysis in the air at a temperature rising rate of 5° C./min, a peak position of the linear differential curve of weight decrease by burning is obtained at 500° C. or higher, preferably at 540° C. or higher. That is, the heat-resistance or oxidation resistance is high. The thermal analysis will be described later.

The single-walled carbon nanotubes obtained by the conventional production processes have a large amount of catalyst acting as an oxidation catalyst adhered thereto. Even if the metal catalyst is removed, the numbers of defects are large, so that when they are subjected to a thermal analysis in the air, only the results that they are burned at a low temperature are obtained. When the single-walled carbon nanotubes obtained by the present invention in the state that catalyst and catalyst support material are adhered thereto, that is, in the as produced state, are subjected to the thermal analysis, the results showing the high oxidation resistance are obtained. Needless to say, by decreasing the concentration of the catalyst in the single-walled carbon nanotubes-containing composition, the heat resistance of the carbon nanotubes is increased. Those showing the position of the above-described peak at 550° C. or higher, at 560° C. or higher, at 570° C. or higher, and at 580° C. or higher can be obtained.

The single-walled carbon nanotubes having such a high heat resistance and high oxidation resistance have not yet been obtained, and were first provided by the present invention. The half value width of the above-mentioned peak is not more than 170° C. Similar to the peak position, the half value width can be made smaller by decreasing the catalyst concentration in the single-walled carbon nanotubes-containing composition, that is, by increasing the content of the carbon nanotubes. By the production process of the present invention, those giving the half value width of not more than 120° C., not more than 100° C., not more than 90° C., not more than 80° C., not more than 70° C., and as the one giving the sharpest peak, those giving the half value width of not more than 60° C. can be obtained. The fact that the half value width is small means that the purity is high, the number of defect sites is small and the diameter distribution of the single-walled carbon nanotubes is uniform.

The major component of the single-walled carbon nanotubes obtained by the present invention is the single-walled carbon nanotubes, and the diameter can be estimated by resonance Raman scattering measurement. The diameter is determined by the following equation:

(Diameter(nm) of Single-walled Carbon Nanotube)=248/(Raman Shift(cm$^{-1}$) of RMB).

RBM will be described later.

The average diameter obtained by resonance Raman scattering measurement is defined as that obtained by totaling the values multiplied the diameter determined from the peak in the vicinity of 150 to 300 cm$^{-1}$ (including up to 310 cm$^{-1}$) obtained by the resonance Raman scattering measurement (excitation wavelength: 488 nm) and the height of each peak together, and dividing the sum by the sum of the peak heights. Although whether the peak height measured by resonance Raman scattering measurement is quantitative or not is controversial and so there is a possibility that the average diameter defined above may be different from the actual average diameter, since the viewing area observed with a transmission electron microscope is limited, and determining the diameters is laborious, the average diameter is defined by the method described above in the present invention.

As mentioned above, by the production process of the present invention, single-walled carbon nanotubes with high quality and high purity can be obtained. Thus, the compositions containing the single-walled carbon nanotubes obtained by the production process of the present invention are also within the scope of the present invention. Examples of the single-walled carbon nanotubes-containing composition include the 6 types of compositions (1) to (6) satisfying the following conditions: These compositions can be produced separately by controlling the conditions.

A composition containing single-walled carbon nanotubes satisfying the conditions mentioned below; namely, (1) a) a peak position of the linear differential curve of weight decrease by burning is obtained at 500° C. or higher when a composition containing the single-walled carbon nanotubes is thermally analyzed at a temperature rising rate of 5° C./min in the air, and the half value width of the peak is smaller than 170° C.;

b) when the composition is observed with a transmission electron microscope at a magnification of not less than ×1,000,000, the single-walled carbon nanotubes are observed; and c) when the composition containing single-walled carbon nanotubes is observed by the resonance Raman scattering measurement (an excitation wavelength is 488 nm);

(1) G band is observed in the vicinity of 1590 cm$^{-1}$ and the G band is split; and (2) a peak height in the vicinity of 1350 cm$^{-1}$ (D band) is not more than ⅓ of a peak height in the vicinity of 1590 cm$^{-1}$.

(2) A single-walled carbon nanotube-containing composition satisfying the following conditions:

A composition containing single-walled carbon nanotubes satisfying the conditions mentioned below, namely, a) when the composition containing the single-walled carbon nanotubes is thermally analyzed with a temperature rising rate of 5° C./min in the air, a peak position of a linear differential curve of weight decrease by burning is observed at a temperature of 570° C. or higher, and the half value width of the peak is smaller than 80° C.;

b) when an electron micrograph of the composition containing single-walled carbon nanotubes is taken with a transmission electron microscope at a magnification of not less than ×1,000,000, at least 10% of the viewing area sizing 100 nm×100 nm is occupied by the carbon nanotubes, and not less than 70% thereof is the single-walled carbon nanotubes.

(3) A single-walled carbon nanotube-containing composition having the maximum peak in the range between 150 and 300 cm$^{-1}$ at 258±5 cm$^{-1}$ when the single-walled carbon nanotube-containing composition is observed by the resonance Raman scattering measurement (an excitation wavelength is 488 nm).

(4) A single-walled carbon nanotube-containing composition having the maximum peak and the second maximum peak in the range between 150 and 300 cm$^{-1}$ at 201±5 cm$^{-1}$ and at 258±5 cm$^{-1}$, respectively, when the single-walled carbon nanotube-containing composition is observed by the resonance Raman scattering measurement (an excitation wavelength is 488 nm).

(5) A single-walled carbon nanotube-containing composition having the maximum peak in the range between 150 and 300 cm$^{-1}$ at 193±5 cm$^{-1}$ when the single-walled carbon nanotube-containing composition is observed by the resonance Raman scattering measurement (an excitation wavelength is 633 nm).

(6) A single-walled carbon nanotube-containing composition having the maximum peak in the range between 150 and 300 cm$^{-1}$ at 280±5 cm$^{-1}$ when the single-walled carbon nanotube-containing composition is observed by the resonance Raman scattering measurement (an excitation wavelength is 633 nm).

When the composition is subjected to a thermal analysis in the air at a temperature rising rate of 5° C./min, the peak position of the linear differential curve of weight decrease by burning is obtained at 500° C. or higher. The thermal analysis herein means the analysis by the apparatus so called TG/DTA. TG analysis (TGA) is to measure the weight decrease when the sample is continuously heated, and DTA is to measure the amount of exothermic heat and the amount of endothermic heat when the sample is continuously heated. The linear differential curve of weight decrease by burning is so called DTG. As to whether the weight decrease is caused by burning or not, if an exothermic peak is shown in DTA, the weight decrease is regarded as caused by burning.

Figure 16:
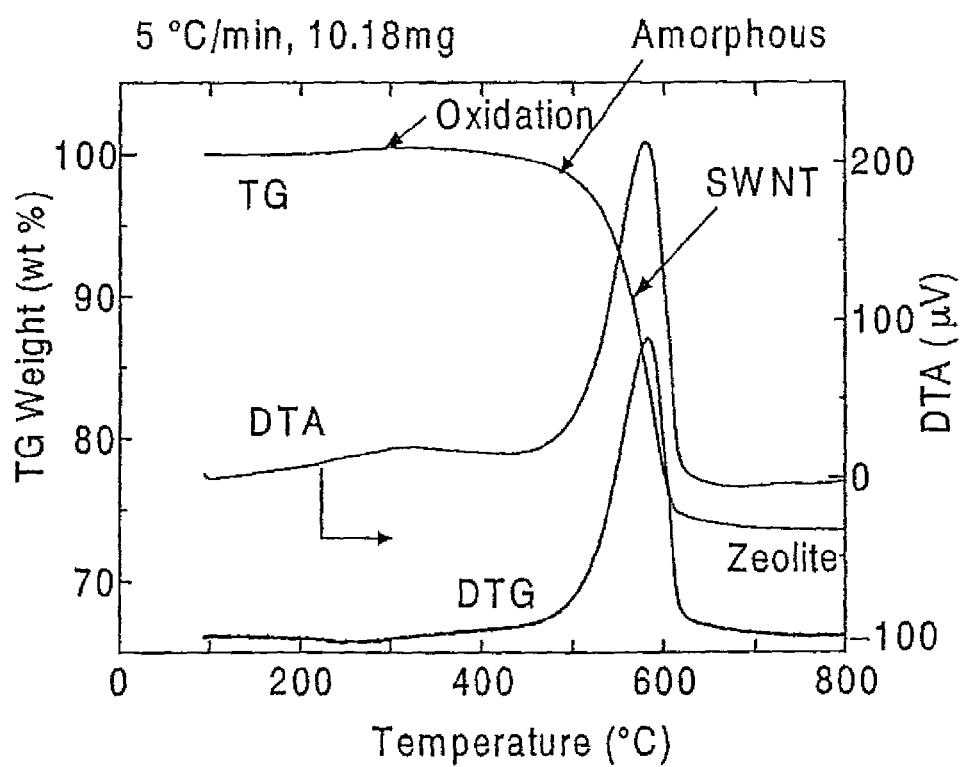
FIG. 16 is a drawing for explaining how to read the measurement results of thermal analyses (TG, DTA and DTG).

It is well-known that the yield and quality of the generated single-walled carbon nanotubes can be evaluated by TGA. An example of TGA of a sample generated by the production process of the present invention is shown in FIG. 16.

The measurement steps of TGA employed in the present invention are as follows: About 10 mg of a sample generated was kept at 100° C. for 120 minutes to remove the adsorbed water, and then the sample was heated at a rate of 5° C./min. Air was used as the atmosphere. FIG. 16 shows the weight change (TG), differential thermal analysis (DTA) and differential weight change (DTG). As the reference of DTA, a vacant platinum pan was used. The slight weight increase from 250° C. to 400° C. is mainly due to oxidation of the catalyst metal. The weight decrease from 400° C. to 500° C. is due to oxidative decomposition reaction of amorphous carbon. The weight decrease from 500° C. to 600° C. is due to the oxidative decomposition reaction of the single-walled carbon nanotubes, and the residue at temperatures higher than 800° C. is zeolite and metal catalyst. In the present invention, the weight decreased from 500° C. to 700° C. was regarded as the weight of the single-walled carbon nanotubes. Thus, the yield of the single-walled carbon nanotubes means the ratio of decreased weight from 500° C. to 700° C.

It is known that the oxidative decomposition reaction temperature of single-walled carbon nanotubes is strongly dependent on the diameters of the nanotubes and the structure of the defects in the walls of the tubes. The larger the diameters of the nanotubes, the higher the oxidative decomposition reaction temperature, and the smaller the number of defects and so the higher the quality, the higher the oxidative decomposition reaction temperature.

That is, the higher the peak position in the linear differential curve of weight decrease by burning (DTG), the smaller the number of defects and the higher the heat resistance. The single-walled carbon nanotubes obtained by the conventional production processes have a large amount of catalyst acting as an oxidation catalyst adhered thereto. Even if the metal catalyst is removed, the numbers of defects are large, so that when they are subjected to thermal analysis in the air, only the results that they are burned at a low temperature are obtained. When the single-walled carbon nanotubes obtained by the present invention in the state that catalyst is adhered thereto (the state in which the catalyst is not removed), are subjected to the thermal analysis, the results showing the high oxidation resistance are obtained. Needless to say, by decreasing the concentration of the catalyst in the single-walled carbon nanotubes-containing composition, the heat resistance of the carbon nanotubes is increased. As can be seen from the Examples, by controlling the reaction conditions, those showing the position of the above-described peak is at 540° C. or higher, 550° C. or higher, at 560° C. or higher, at 570° C. or higher, and at 580° C. or higher can be obtained.

The single-walled carbon nanotubes having such a high heat resistance have not existed on the earth, and were first provided by the present invention. The half value width of the above-mentioned peak is not more than 170° C. Similar to the peak position, the half value width can be made smaller by decreasing the catalyst concentration in the single-walled carbon nanotubes-containing composition. By controlling the reaction conditions, those giving the half value width of not more than 120° C., not more than 100° C., not more than 90° C., not more than 80° C., not more than 70° C., and as the one giving the sharpest peak, those giving the half value width of not more than 60° C. can be obtained.

The single-walled carbon nanotubes of the present invention have the high heat resistance even in the as synthesized state, that is, in the state that the catalyst is adhered to the nanotubes. Thus, it is expected that the heat resistance can be further increased by removing the catalyst or by annealing the carbon nanotubes in vacuum.

To the single-walled carbon nanotubes-containing composition of the present invention, it is indispensable that a G band is observed in the vicinity of 1590 cm$^{-1}$ and the G band be split, when the composition is observed by the resonance Raman scattering measurement (an excitation wavelength is 488 nm). This split is obtained especially when the carbon nanotubes are those having few defects. Needless to say, although in some cases, the single-walled carbon nanotubes obtained by the production process of the present invention do not have this split, single-walled carbon nanotubes having a split in the G band can be obtained by selecting reaction conditions.

To the single-walled carbon nanotubes-containing composition of the present invention, it is indispensable that the ratio of the peak height in the vicinity of 1350 cm$^{-1}$ (D band) to the peak height in the vicinity of 1590 cm$^{-1}$ be not more than ⅓ when the composition is observed by the resonance Raman scattering measurement (an excitation wavelength is 488 nm). The smaller ratio of the peak height in the vicinity of 1350 cm$^{-1}$ (D band) to the peak height in the vicinity of 1590 cm$^{-1}$ indicates the higher quality of the single-walled carbon nanotubes obtained. The ratio is preferably not more than ⅒, more preferably not more than 1/20. By controlling the conditions, those having a small D/G ratio can be obtained. In the present invention, concerning the peak position in Raman, "vicinity" means ±10 cm$^{-1}$.

It is preferred that the diameter of the single-walled carbon nanotubes can be controlled. In the present invention, the diameter can be controlled by the temperature and the partial pressure of the raw material. A single-walled carbon nanotube-containing composition having the maximum peak in the range between 150 and 300 cm$^{-1}$ at 258±5 cm$^{-1}$ when the single-walled carbon nanotube-containing composition is observed by the resonance Raman scattering measurement (an excitation wavelength is 488 nm), and a single-walled carbon nanotube-containing composition having the maximum peak in the range between 150 and 300 cm$^{-1}$ at 193±5 cm$^{-1}$ or at 280±5 cm$^{-1}$ when the single-walled carbon nanotube-containing composition is observed by the resonance Raman scattering measurement (an excitation wavelength is 633 nm) can be obtained. Particularly, the single-walled carbon nanotubes of the present invention are characterized in that the peak at 258±5 cm$^{-1}$ in RBM is the highest or the second highest when measured with an excitation wavelength of 488 nm, and in that in cases where the peak at 258±5 cm$^{-1}$ is the second highest, the highest peak is at 201±5 cm$^{-1}$.

Single-walled carbon nanotubes having an average diameter of not more than 1.2 nm were obtained, which average diameter was determined as described above from the peaks observed by the resonance Raman scattering measurement (an excitation wavelength is 488 nm). Because of the following reasons, the thinner the single-walled carbon nanotubes, the more preferred.

(1) When used as an electron emissive material, the single-walled carbon nanotubes more easily emit electrons.
(2) When the single-walled carbon nanotubes are used as a composite material with a resin or the like, the effect of addition is larger.

The single-walled carbon nanotubes can be prepared controlling the average diameter to not more than 1.1 nm, preferably not more than 1.0 nm.

The single-walled carbon nanotubes of the present invention are also characterized by the high purity, and when the carbon nanotubes-containing composition is observed with a transmission electron microscope at a magnification of not less than ×1,000,000, a photograph in which at least 30% of the viewing area sizing 100 nm×100 nm is occupied by the carbon nanotubes, and not less than 95% thereof is the single-walled carbon nanotubes is obtained.

By the production process of the present invention, such single-walled carbon nanotubes as described above can be obtained, and such a single-walled carbon nanotubes-containing composition as described above can be obtained.

The step in the production process of the present invention can be carried out by placing the catalyst in an electric furnace or the like, changing the atmosphere of the catalyst to the above-described atmosphere, and heating the atmosphere to the above-described heating temperature. Alternatively, the step can also be carried out by preliminarily setting the atmosphere and the temperature to the conditions desired in the present invention, and then placing the catalyst therein, that is, the step can also be carried out like a so called combustion reaction.

The single-walled carbon nanotubes obtained by the production process of the present invention may be applied to the fields in which the carbon nanotubes are actually used or the possibility of the use has been suggested. For example, they may be applied to various electronic device elements such as nano-scale wirings, field-effect transistors, field emission display emitters, negative electrode materials of lithium secondary cell and the like, gas adsorption materials, hydrogen storage materials, various composite materials and the like. In addition to these, they may be applied to various fields depending on the characteristics of the single-walled carbon nanotubes.

As described above, single-walled carbon nanotubes which are free from contaminated multi-walled carbon nanotubes, amorphous carbon, carbon nanoparticles and the like, which have a high quality and few defects, and which have high heat resistance and high oxidation resistance, can be produced. Further, by the present invention, single-walled carbon nanotubes having a high quality and few defects can be produced safely with a high yield in a large scale.

The present invention will now be described in more detail by way of Examples thereof. However, the present invention is not restricted to the Examples.

Example 1

Synthesis of Catalyst

Y zeolite HSZ-390HUA (produced by TOSOH Corporation: silica/alumina ratio=approximately 400) in an amount of about 1 g, iron acetate (($CH_3COO)_2Fe$) and cobalt acetate (($CH_3COO)_2Co.4H_2O$) were provided. The iron acetate and the cobalt acetate were dissolved in 20 $cm^3$ of ethanol to a concentration of 2.5 wt % in terms of the concentration of iron and cobalt, respectively, and then the Y zeolite was mixed therein. The resultant was subjected to ultrasonication for 10 minutes, and dried at 80° C. for 24 hours to obtain a catalyst in the form of pale yellow powder.

[Synthesis of Single-Walled CNTs]

The catalyst in the form of pale yellow powder was placed on a quartz boat, and arranged in a quartz tube in an electric furnace. During heating the inside of the electric furnace (about 30 minutes) to a desired temperature (600° C., 650° C., 700° C., 800° C. or 900° C.), the atmosphere inside the quartz tube (inner diameter: 27 mm) was replaced with an Ar atmosphere. More specifically, Ar gas was flown thereinto at a rate of 200 sccm.

After reaching the desired temperature, the quartz tube was evacuated and the inside thereof was kept under an ethanol atmosphere for about 10 minutes keeping the temperature. During this operation, the ethanol pressure was 5 to 10 Torr (0.67 to 1.3 kPa), and a flow at a rate of 100 to 300 sccm was produced by a vacuum pump. This flow rate can be calculated from the weight loss of the ethanol per hour. The temperature was then lowered to obtain black powders A-1 to A-5 on the quartz boat, respectively.

Figure 2:
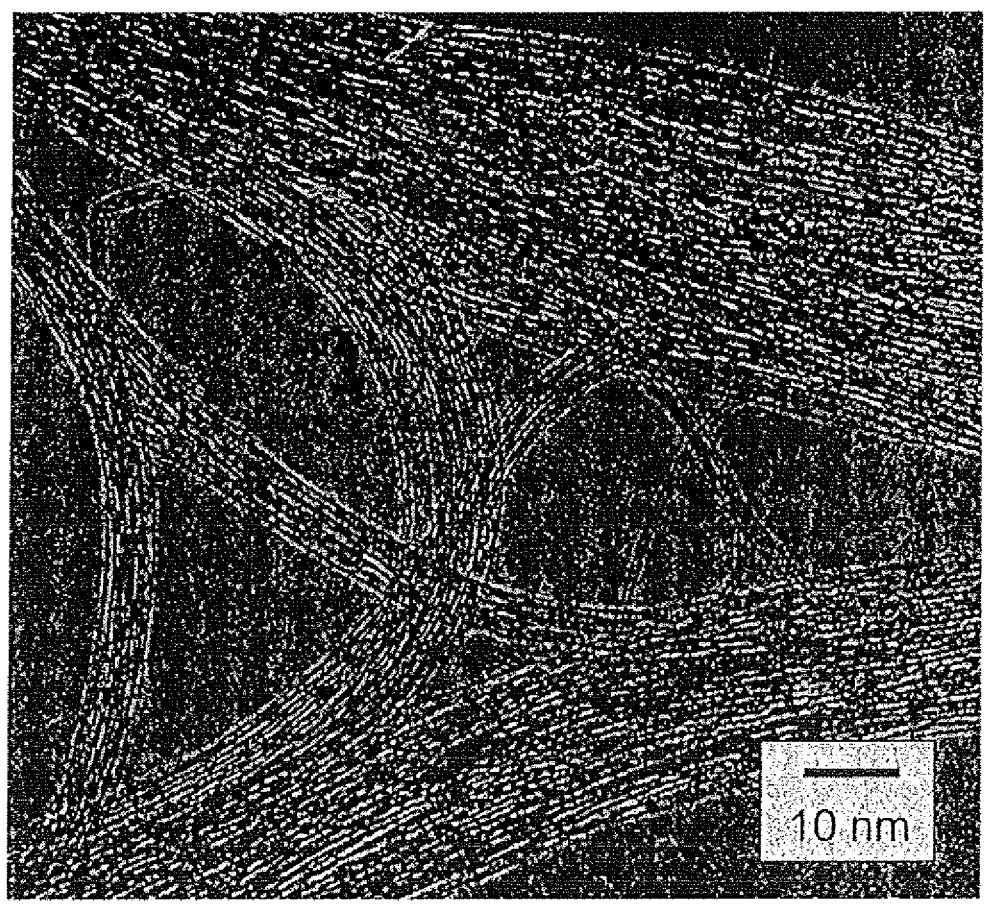
FIG. 2 shows a TEM image of the single-walled carbon nanotubes obtained in Example 1.
Figure 3:
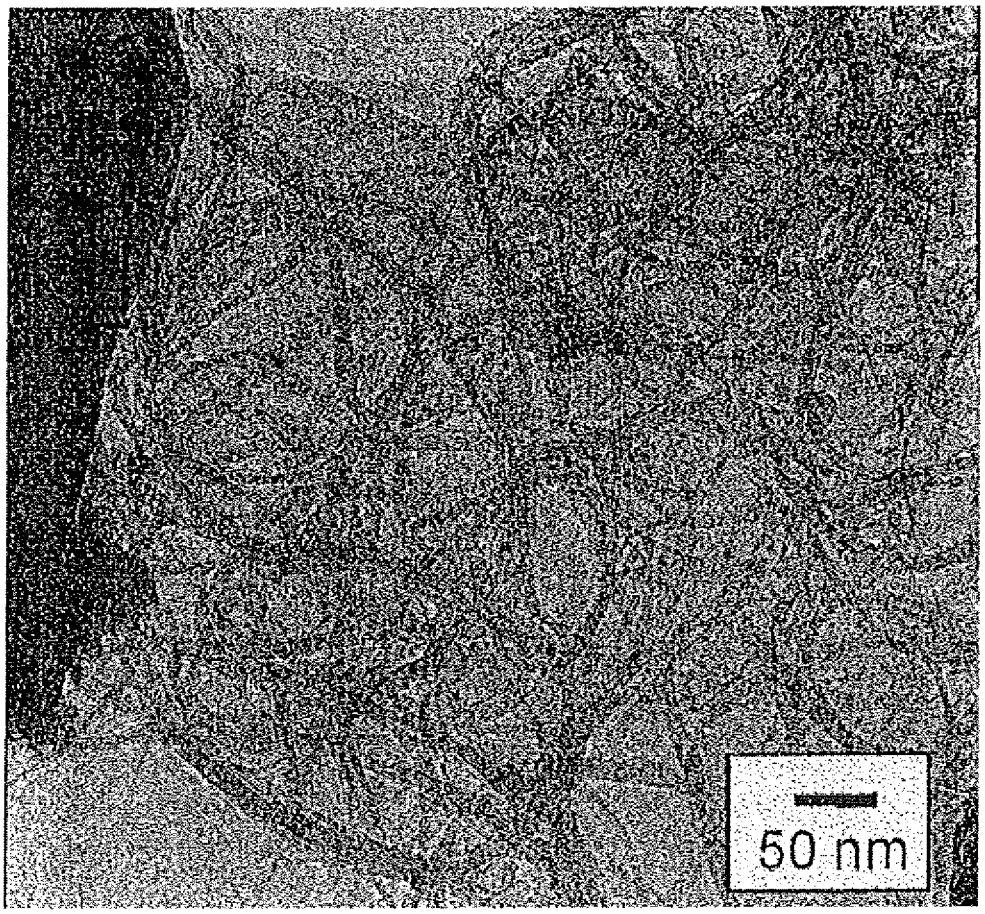
FIG. 3 shows a TEM image of the single-walled carbon nanotubes obtained in Example 1.

The obtained black powders A-1 to A-5 was analyzed by Raman spectroscopy (excitation wavelength: 488 nm) and observed by SEM (FIG. 1) and TEM (FIGS. 2 and 3). As a result, it was confirmed that they were good quality single-walled carbon nanotubes having a diameter from 0.8 nm to 1.5 nm.

Figure 4:
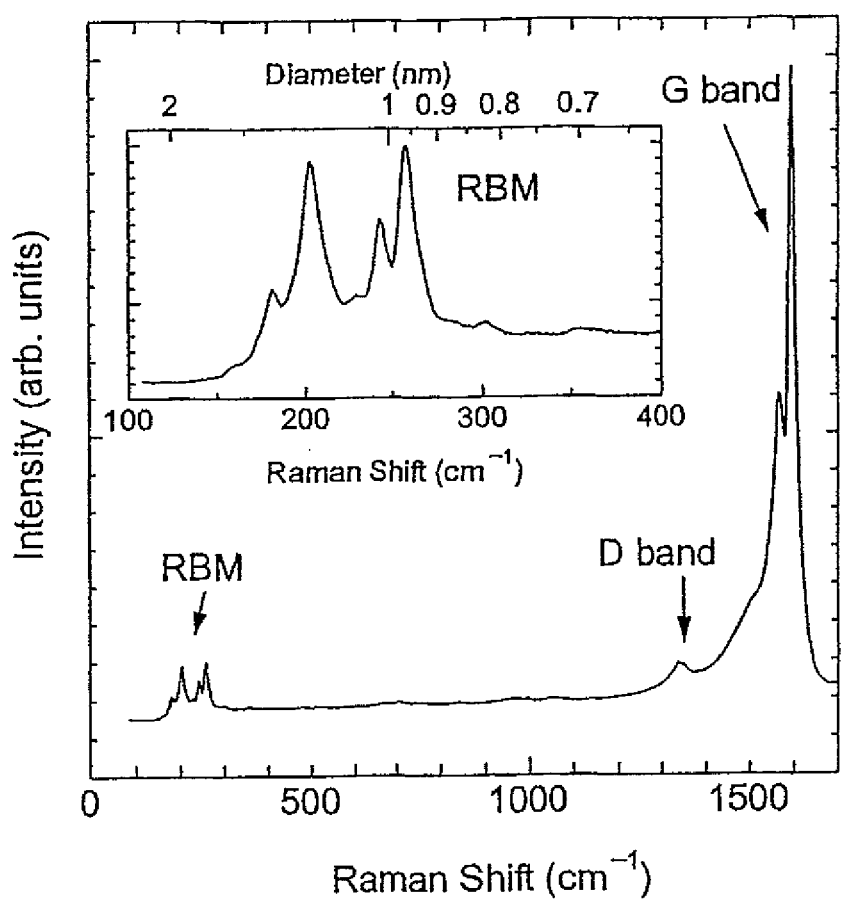
FIG. 4 shows the results of Raman spectroscopy (488 nm) of the single-walled carbon nanotubes A-4 obtained in Example 1.
Figure 5:
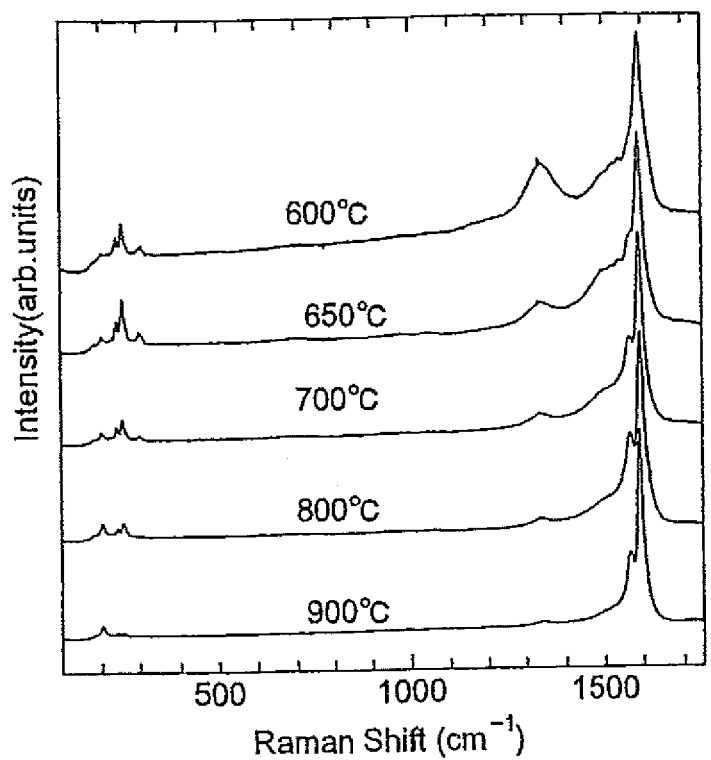
FIG. 5 shows the results of Raman spectroscopy (488 nm) of the single-walled carbon nanotubes A-1 to A-5 obtained in Example 1.
Figure 6:
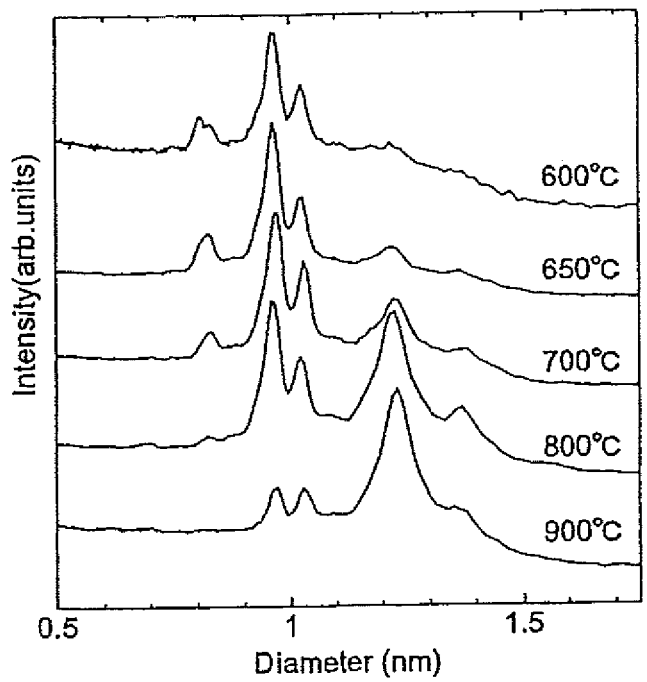
FIG. 6 shows the distributions of the diameter of single-walled carbon nanotubes at varying temperatures, which distributions were determined from Raman spectroscopy (488 nm) of the single-walled carbon nanotubes A-1 to A-5 obtained in Example 1.

The results are shown in Table 1, and the results of the Raman spectroscopy are shown in FIGS. 4 to 6. In FIG. 6, the diameter of the single-walled carbon nanotube (referred to as "single-walled CNT" for short) was calculated from the following equation:

(Diameter(nm) of Single-walled CNT)=248/(Raman Shift($cm^{-1}$) of RBM)

RBM will be described later.

TABLE 1

| Catalyst | Carbon source | Heating temp. (° C.) | Single-walled CNT | Average diameter (nm) | RBM (excitation wavelength: 633 nm) maximum peak position ($cm^{-1}$) |
|---|---|---|---|---|---|
| Fe/Co | Ethanol | 600 | A-1 | 0.95 | 283 |
| Fe/Co | Ethanol | 650 | A-2 | 0.97 | 283 |
| Fe/Co | Ethanol | 700 | A-3 | 0.99 | 283 |
| Fe/Co | Ethanol | 800 | A-4 | 1.05 | 193 |
| Fe/Co | Ethanol | 900 | A-5 | 1.14 | 193 |

As seen from Table 1, the higher the temperature, the larger the diameter of the single-walled carbon nanotubes obtained. From the SEM image and TEM images shown in FIGS. 1 to 3, it was confirmed that they were single-walled carbon nanotubes free from defects with a very high quality.

As seen from FIG. 3, the catalyst is adhered to one end of the nanotubes. As seen from FIG. 2, with a transmission electron microscope at a magnification of about ×1,100,000, a micrograph of the viewing area sizing 100 nm×100 nm is obtained, in which at least 30% of the viewing area is occupied by the carbon nanotubes wherein not less than 95% thereof are single-walled carbon nanotubes. Further, from FIGS. 4 and 5, it was confirmed that they were single-walled carbon nanotubes free from defects with a very high quality.

That is, it was confirmed that a G band was observed in the vicinity of 1590 $cm^{-1}$ and the G band was split at a temperature of 700° C. or higher; a peak (RBM: radial breathing mode) originated from the single-walled carbon nanotubes and related to the diameter of the single-walled carbon nanotubes was observed at 150 to 300 $cm^{-1}$; and that a peak at 1350 $cm^{-1}$ (D band) originated from the undesired amorphous carbon was not observed or even observed, the peak was small (Table 7).

Figure 18:
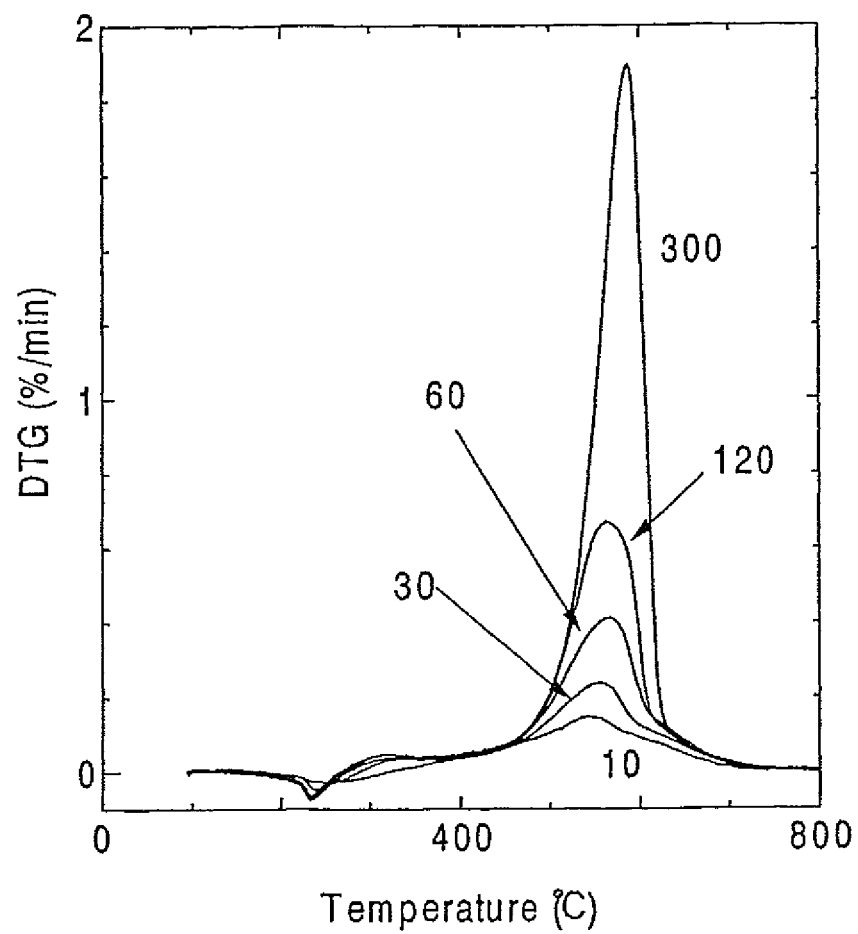
FIG. 18 shows the DTG of the single-walled carbon nanotubes synthesized in Example 7.

Further, as a result of a thermal analysis of Sample A-4 in the air with a heating rate of 5° C./min, the peak position in the linear differential curve of weight decrease by burning was at 543° C. The half value width of the peak was 162° C. (FIG. 18).

Figure 15:
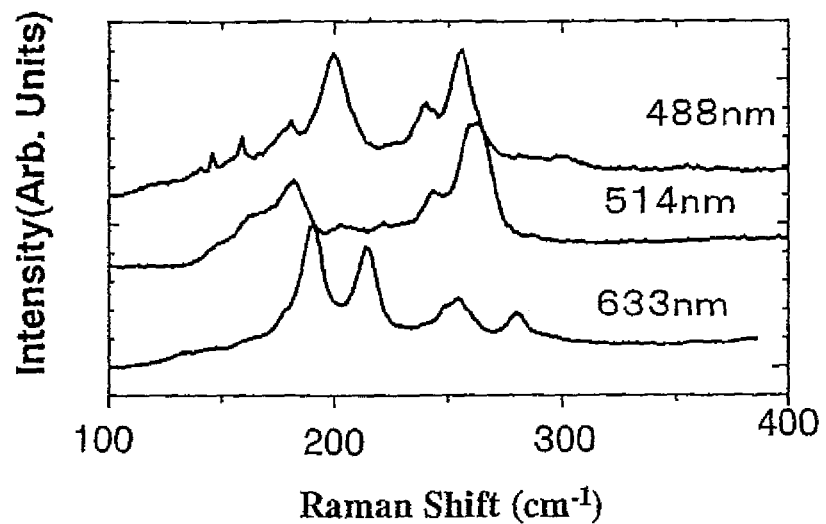
FIG. 15 shows the results of Raman spectroscopy at an excitation wavelength of 488 nm, 514 nm or 633 nm, of the single-walled carbon nanotubes A-4 obtained in Example 1.

The results of Raman spectroscopy of Sample A-4 measured employing an excitation wavelength of 488 nm, 514 nm or 633 nm are shown in FIG. 15. It can be seen from the results of Raman analysis at 488 nm, the maximum peak was 258±5 $cm^{-1}$ and the second highest peak was 201±5 $cm^{-1}$. It can be seen from the results of Raman analysis at 633 nm, the highest peak was at 193±5 $cm^{-1}$.

The maximum peaks in the RBM (150-300) of the Raman analysis measured the other sample at an excitation wavelength of 633 nm are shown in Table 1. The positions of RBM peaks at an excitation wavelength of 488 inn are shown in Table 7.

Example 2

Figure 7:
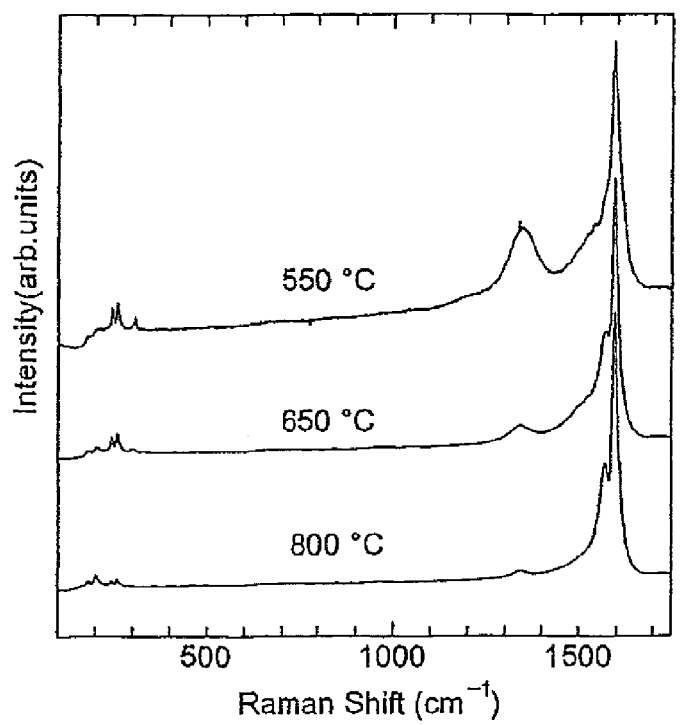
FIG. 7 shows the results of Raman spectroscopy (488 nm) of the single-walled carbon nanotubes A-6 to A-8 obtained in Example 1
Figure 8:
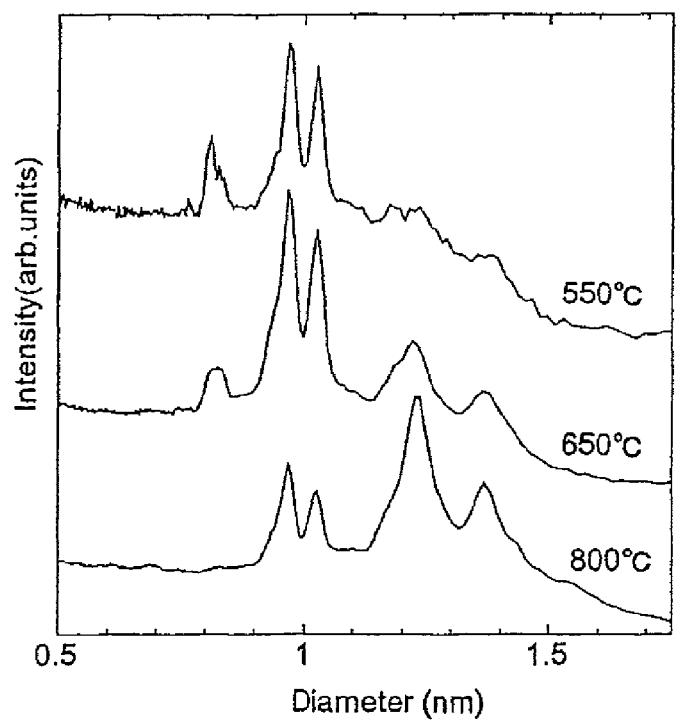
FIG. 8 shows the distributions of the diameter of single-walled carbon nanotubes at varying temperatures, which distributions were determined from Raman spectroscopy (488 nm) of the single-walled carbon nanotubes A-6 to A-8 obtained in Example 2.

Black powders, that is, single-walled carbon nanotubes A-6 to A-8, were obtained in the same manner as in Example 1 except that methanol was used in place of ethanol. The results are shown in Table 2. The results of Raman spectroscopy are shown in FIGS. 7 and 8. The DIG ratio of the results of Raman spectroscopy was read from FIG. 7, and the calculation results are shown in Table 7.

TABLE 2

| Catalyst | Carbon source | Heating temp. (° C.) | Single-walled CNT | Average diameter (nm) |
|---|---|---|---|---|
| Fe/Co | Methanol | 550 | A-6 | 0.96 |
| Fe/Co | Methanol | 650 | A-7 | 0.97 |
| Fe/Co | Methanol | 800 | A-8 | 1.18 |

As seen from Table 2, the higher the temperature, the larger the diameter of the single-walled carbon nanotubes obtained. From the TEM (SEM) images (similar images as shown in FIGS. 1 to 3) not shown, it was confirmed that they were single-walled carbon nanotubes free from defects with a very high quality. Further, from the results of Raman spectroscopy, what were confirmed in Example 1 were also confirmed.

Example 3

Figure 9:
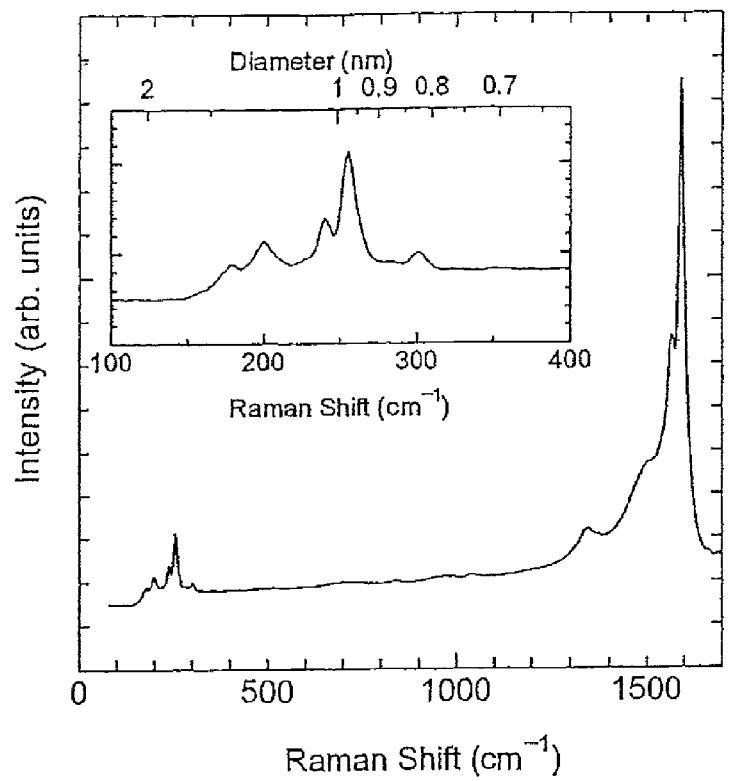
FIG. 9 shows the results of Raman spectroscopy (488 nm) of the single-walled carbon nanotubes A-9 obtained in Example 3.
Figure 10:
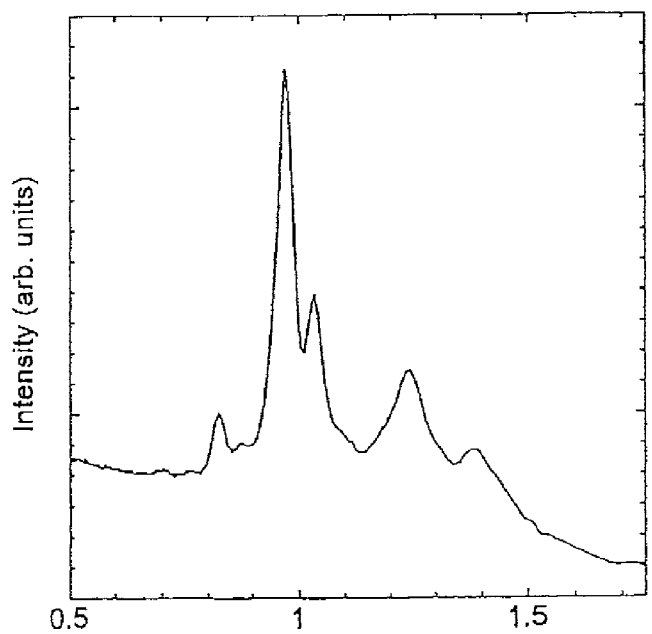
FIG. 10 shows the distribution of the diameter of single-walled carbon nanotubes, which distribution was determined from Raman spectroscopy (488 nm) of the single-walled carbon nanotubes A-9 obtained in Example 3.

Black powder, that is, single-walled carbon nanotubes A-9, was obtained in the same manner as in Example 1 except that Ni/Co catalyst was used in place of Fe/Co. The results are shown in Table 3. The results of Raman spectroscopy are shown in FIGS. 9 and 10, and in Table 7.

TABLE 3

| Catalyst | Carbon source | Heating temp. (° C.) | Single-walled CNT | Average diameter (nm) |
|---|---|---|---|---|
| Ni/Co | Ethanol | 800 | A-9 | 0.99 |

From the TEM (SEM) images (similar images as shown in FIGS. 1 to 3) not shown, it was confirmed that they were single-walled carbon nanotubes free from defects with a very high quality. Further, from the results of Raman spectroscopy, what were confirmed in Example 1 were also confirmed.

Example 4

Black powder, that is, single-walled carbon nanotubes A-10, was obtained in the same manner as in Example 1 except that MgO was used in place of Fe/Co-supporting zeolite. The results are shown in Table 4.

TABLE 4

| Catalyst | Support material | Carbon source | Heating temp. (° C.) | Single-walled CNT | Average diameter (nm) |
|---|---|---|---|---|---|
| Fe/Co | MgO | Ethanol | 800 | A-10 | 0.99 |

From the TEM (SEM) images (similar images as shown in FIGS. 1 to 3) not shown, it was confirmed that the black powder was single-walled carbon nanotubes free from defects with a very high quality. Further, from the results of Raman spectroscopy not shown, what were confirmed in Example 1 were also confirmed.

Example 5

Figure 11:
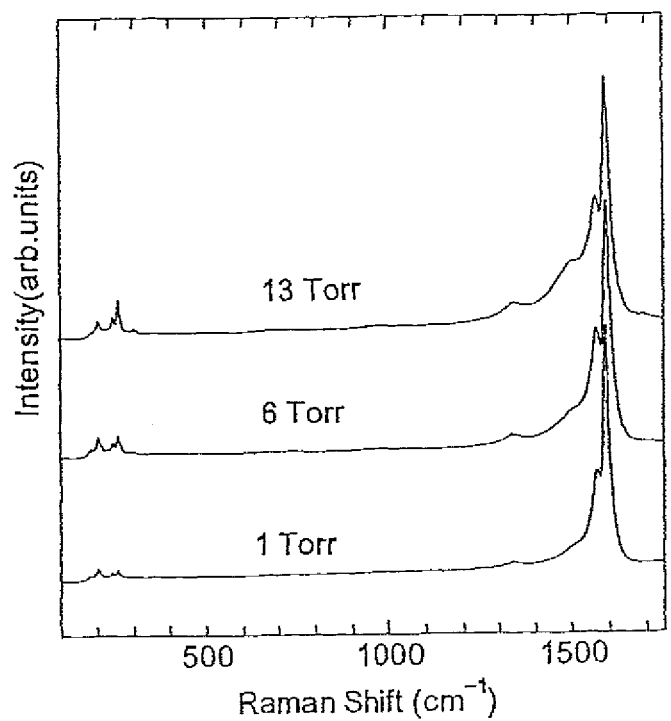
FIG. 11 shows the Raman spectroscopy (488 nm) of the single-walled carbon nanotubes A-11 to A-13 obtained in Example 5.
Figure 12:
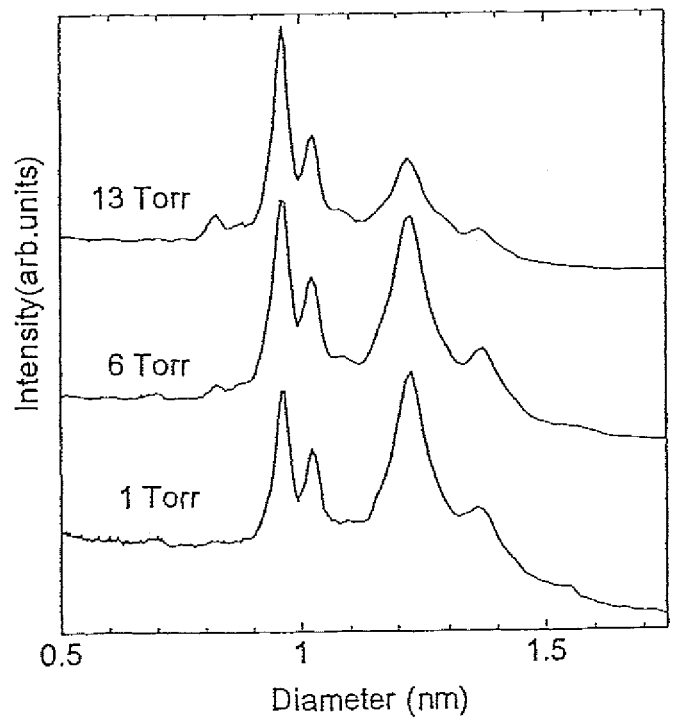
FIG. 12 shows the distributions of the diameter of single-walled carbon nanotubes, which distributions were determined from Raman spectroscopy (488 nm) of the single-walled carbon nanotubes A-11 to A-13 obtained in Example 5.

Single-walled carbon nanotubes A-11 and A-13 were obtained by the same process as the production process of single-walled carbon nanotubes A-4 in Example 1, except that the pressure of ethanol was 1 Torr (0.013 kPa) and the flow rate thereof was 60 sccm in case of single-walled carbon nanotubes A-11, and that the pressure of ethanol was 13 Torr (1.7 kPa) and the flow rate thereof was 1840 sccm in case of single-walled carbon nanotubes A-13. The average diameters of the obtained single-walled carbon nanotubes are shown in Table 5 together with the production conditions thereof. In Table 5, the single-walled carbon nanotubes A-12 correspond to the single-walled carbon nanotubes A-4 in Example 1. The results of Raman spectroscopy of the single-walled carbon nanotubes A-11 to A-13 are shown in FIG. 11. The diameter distributions of the single-walled carbon nanotubes, obtained from Raman spectroscopy are shown in FIG. 12. The analytical results of Raman spectroscopy are shown in Table 7.

TABLE 5

| Catalyst | Carbon source | Pressure (Torr) | Flow rate (sccm) | Heating temp. (° C.) | Single-walled CNT | Average diameter (nm) |
|---|---|---|---|---|---|---|
| Fe/Co | Ethanol | 1 | 60 | 800 | A-11 | 1.05 |
| Fe/Co | Ethanol | 6 | 300 | 800 | A-12 | 1.05 |
| Fe/Co | Ethanol | 13 | 1840 | 800 | A-13 | 0.98 |

From the TEM (SEM) images (similar images as shown in FIGS. 1 to 3) not shown, it was confirmed that single-walled carbon nanotubes A-11 to A-13 were single-walled carbon nanotubes free from defects with a extremely high quality. Further, from Table 5 and FIGS. 11 and 12, the following discussion is presented relating to the change in pressure and flow rate of the carbon source:

That is, the pressure and flow rate of the carbon source represent the collision frequency between the carbon source and the catalyst. In cases where the pressure of the carbon source is low, for example, not higher than 6 Torr (0.78 kPa), since the collision frequency is low, it is thought that there is a sufficient time to anneal the single-walled carbon nanotubes. Therefore, when the pressure of the carbon source is low, for example, not higher than 6 Torr (0.78 kPa), it is thought that single-walled carbon nanotubes having a relatively large diameter can be obtained, and that the diameter distributions are almost the same.

On the other hand, in cases where the pressure of the carbon source is relatively high, for example, not lower than 13 Torr (1.7 kPa), the collision frequency is high, and it is thought that there is a tendency that the time to anneal the single-walled carbon nanotubes is decreased. Therefore, when the pressure of the carbon source is relatively high, for example, not lower than 13 Torr (1.7 kPa), there is a tendency that the relative amount of the single-walled carbon nanotubes having a relatively large diameter which require a long annealing time is decreased.

Example 6

Figure 13:
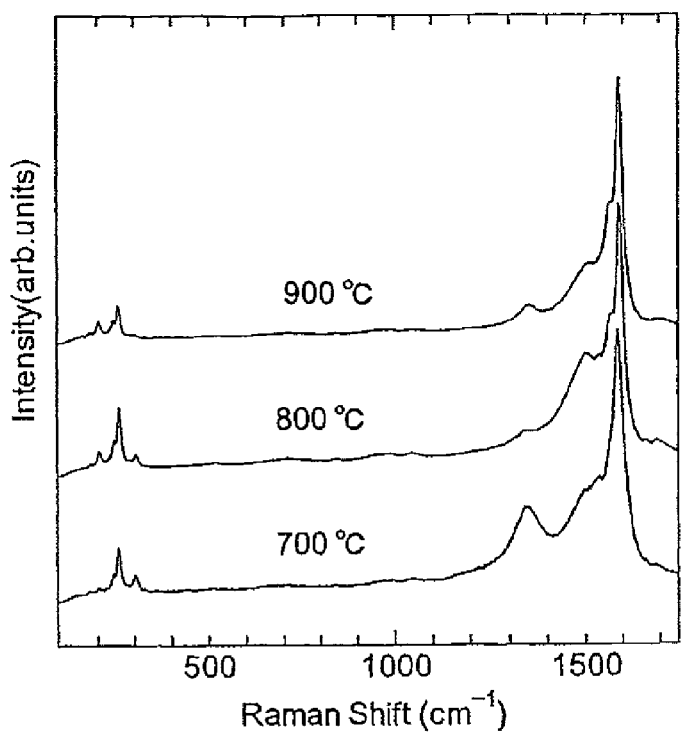
FIG. 13 shows the results of Raman spectroscopy (488 nm) of the single-walled carbon nanotubes A-14 to A-16 obtained in Example 6.
Figure 14:
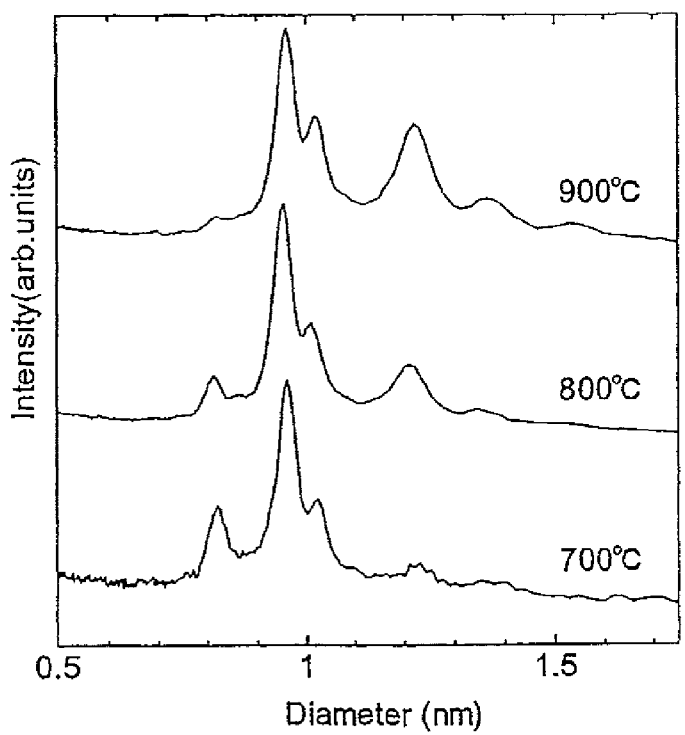
FIG. 14 shows the distributions of the diameter of single-walled carbon nanotubes, which distributions were determined from Raman spectroscopy (488 nm) of the single-walled carbon nanotubes A-14 to A-16 obtained in Example 6.

Black powders, that is, single-walled carbon nanotubes A-14 to A-16, were obtained in the same manner as in Example 1 except that Co (5 wt %) was used in place of Fe/Co, diethyl ether was used in place of ethanol, and that the pressure of diethyl ether was 20 Torr (2.7 kPa). The heating temperatures employed and the results are shown in Table 6. The results of Raman spectroscopy of the single-walled carbon nanotubes A-14 to A-16 are shown in FIG. 13. The diameter distributions of the single-walled carbon nanotubes, obtained from Raman spectroscopy are shown in FIG. 14. The analytical results of Raman spectroscopy and D/G ratio are shown in Table 7.

TABLE 6

| Catalyst | Carbon source | Heating temp. (° C.) | Single-walled CNT | Average diameter (nm) |
|---|---|---|---|---|
| Co | Diethyl ether | 700 | A-14 | 0.93 |
| Co | Diethyl ether | 800 | A-15 | 0.98 |
| Co | Diethyl ether | 900 | A-16 | 1.02 |

As seen from Table 6, the higher the temperature, the larger the average diameter of the single-walled carbon nanotubes obtained. From the TEM (SEM) images (similar images as shown in FIGS. 1 to 3) not shown, it was confirmed that they were single-walled carbon nanotubes free from defects with a very high quality. Further, from the results of Raman spectroscopy, it was confirmed that single-walled carbon nanotubes were similar to those in embodiment 1.

Example 7

Black powders, that is, single-walled carbon nanotubes A-17 to A-21, were obtained in the same manner as in Example 1 except that the temperature of the electric furnace was 800° C., the ethanol pressure was 10 Torr (1.3 kPa) and that the reaction time was 10 minutes, 30 minutes, 60 minutes, 120 minutes or 300 minutes. The heating temperature of the electric furnace and the results are shown in Table 8. A-17 and A-4 are the same sample.

Figure 17:
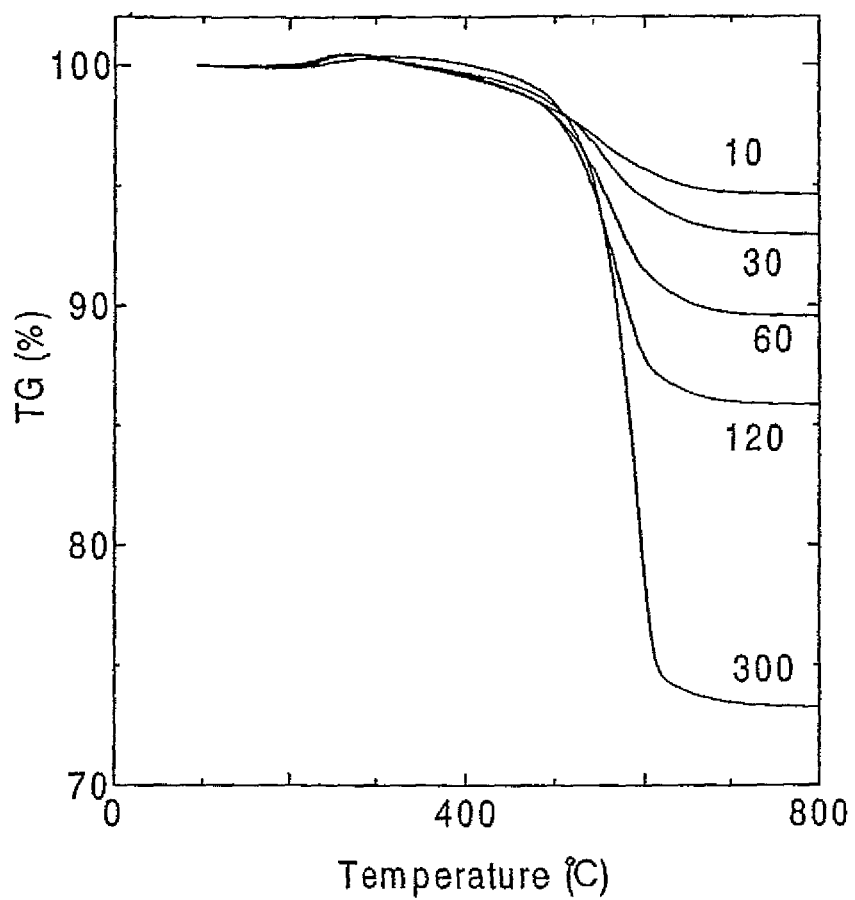
FIG. 17 shows the TG of the single-walled carbon nanotubes synthesized in Example 7.
Figure 19:
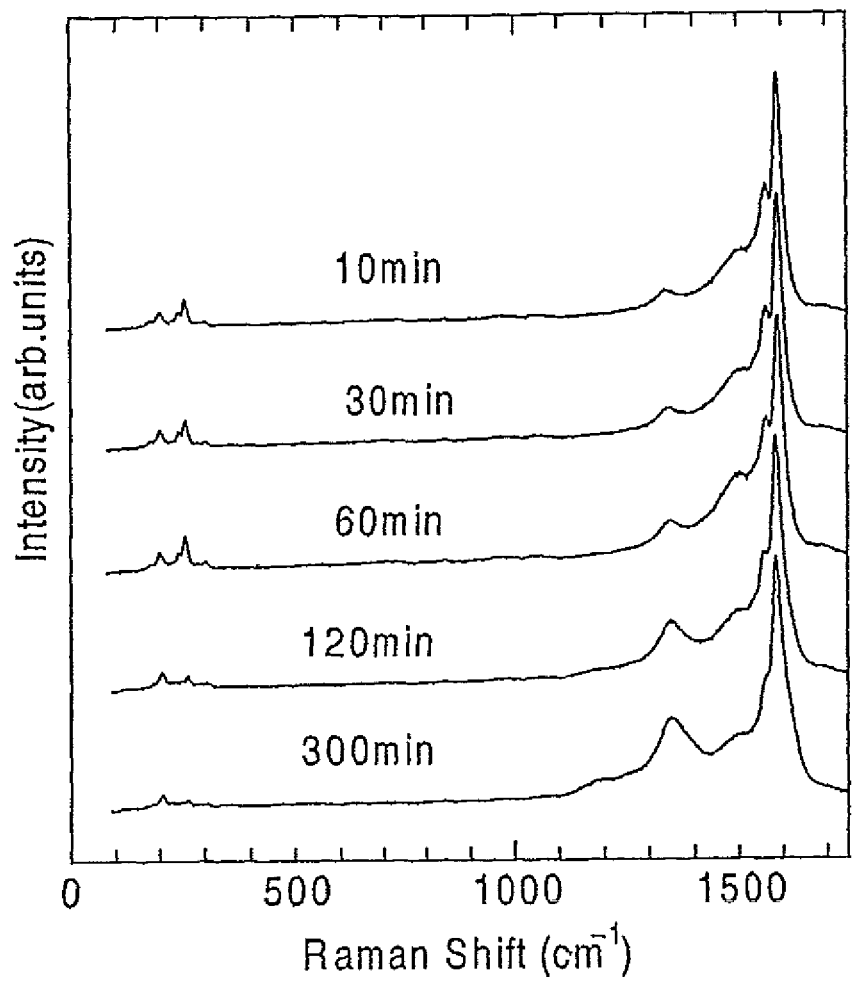
FIG. 19 shows the results of Raman spectroscopy (488 nm) of the single-walled carbon nanotubes synthesized in Example 7.
Figure 20:
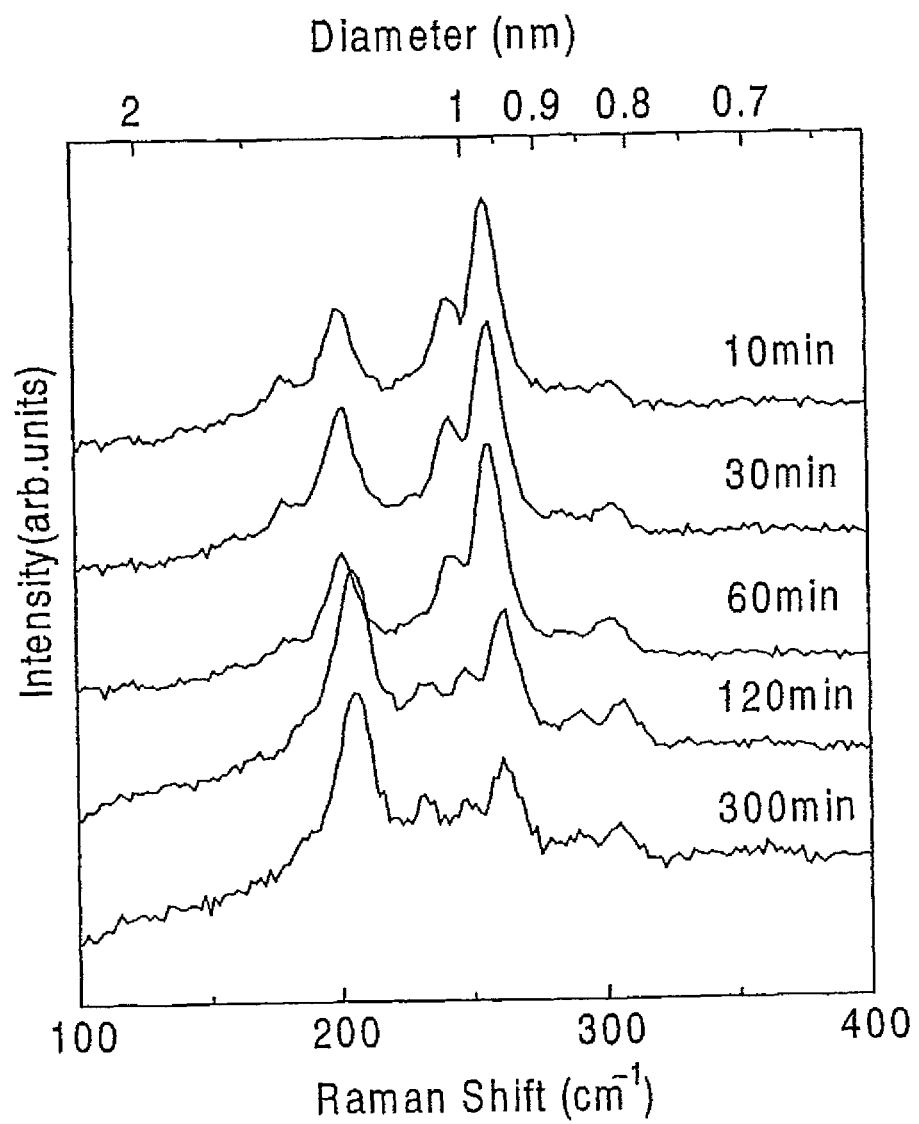
FIG. 20 shows the results (RBM) of Raman spectroscopy (488 nm) of the single-walled carbon nanotubes synthesized in Example 7.

The results of TG of the single-walled carbon nanotubes A-17 to A-21 are shown in FIG. 17, the results of DTG thereof are shown in FIG. 18, and the results of the Raman spectroscopy thereof are shown in FIG. 19. The diameter distributions of the single-walled carbon nanotubes, obtained from Raman spectroscopy are shown in FIG. 20.

It can be seen from FIG. 17 and Table 8, that even if the reaction time is increased, the amount of generated amorphous carbon is hardly increased, and the single-walled carbon nanotubes alone increase monotonously. As shown in FIG. 18, with the increase in the reaction time (10 minutes, 30 minutes, 60 minutes, 120 minutes and 300 minutes), the temperature at which oxidative decomposition of the single-walled carbon nanotubes occurs rises such that the temperature is 543° C., 557° C., 565° C., 563° C. and 587° C., respectively. On the other hand, the half value width decreases such that it is 162° C., 112° C., 94° C., 83° C. and 59° C., respectively. The reason why is thought to be that relatively thick nanotubes (the temperature at which oxidative decomposition occurs is high) are uniformly generated as can be seen from the diameter distributions shown in FIG. 20.

TABLE 8

| Catalyst | Heating temp. (° C.) | Heating time (min) | Single-walled CNT | Yield (%) |
|---|---|---|---|---|
| Fe/Co | 800 | 10 | A-17 | 3.4 |
| Fe/Co | 800 | 30 | A-18 | 5.2 |
| Fe/Co | 800 | 60 | A-19 | 8.2 |
| Fe/Co | 800 | 120 | A-20 | 11.9 |
| Fe/Co | 800 | 300 | A-21 | 25.2 |

Example 8

Black powders, that is, single-walled carbon nanotubes A-22 to A-26, were obtained in the same manner as in Example 7 except that the ethanol pressure was 5 Torr (0.67 kPa). The heating temperature of the electric furnace and the results are shown in Table 9.

TABLE 9

| Catalyst | Heating temp. (° C.) | Heating time (min) | Single-walled CNT | Yield (%) |
|---|---|---|---|---|
| Fe/Co | 800 | 10 | A-22 | 3.5 |
| Fe/Co | 800 | 30 | A-23 | 5.2 |
| Fe/Co | 800 | 60 | A-24 | 6.4 |
| Fe/Co | 800 | 120 | A-25 | 9.4 |
| Fe/Co | 800 | 300 | A-26 | 17.1 |

Figure 21:
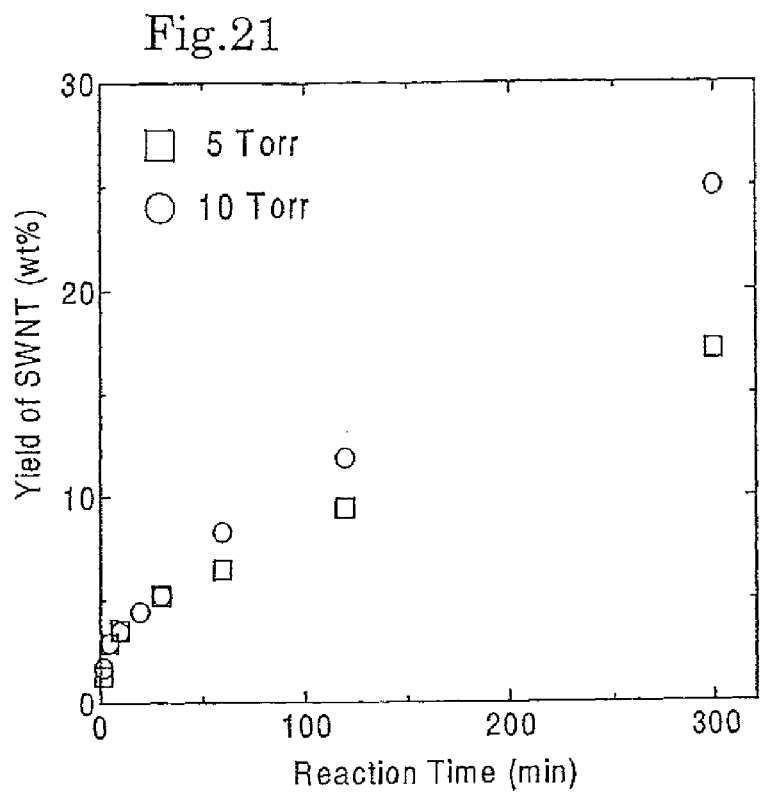
FIG. 21 shows the time dependency of the yields of single-walled carbon nanotubes in Examples 7 and 8.

The reaction time dependences of the yields of single-walled carbon nanotubes in Examples 7 and 8 are shown in FIG. 21. By increasing the reaction time, the yield is almost monotonously increased to reach the maximum yield of 25 wt % (10 Torr (1.3 kPa), 300 minutes). At this point, the percentage of the single-walled carbon nanotubes to the catalyst metal is 500%, and this yield is much higher than the yields by known processes for producing single-walled carbon nanotubes.

Example 9

Figure 22:
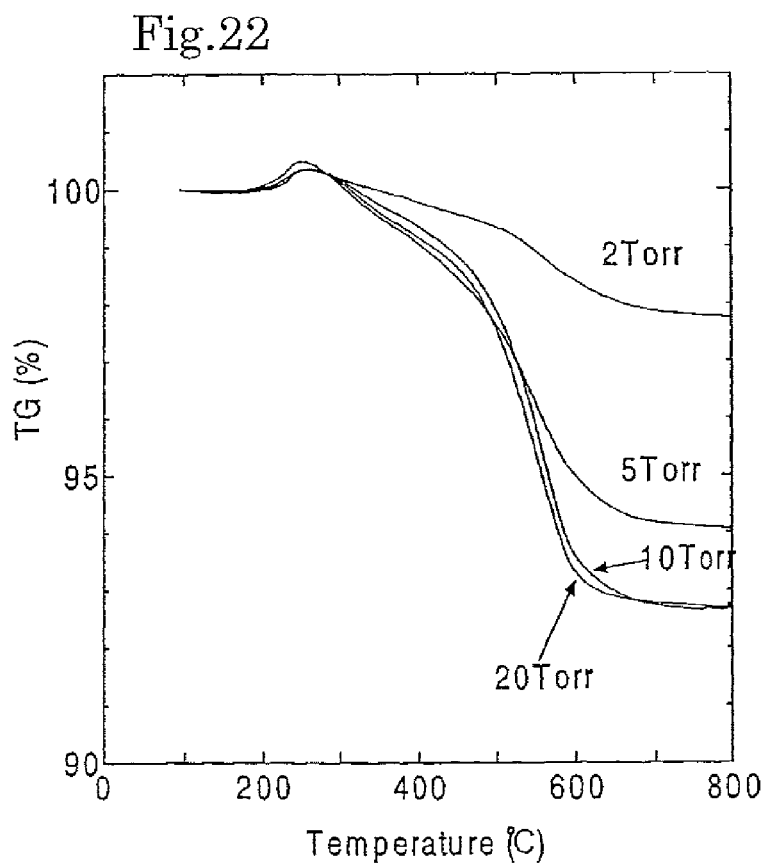
FIG. 22 shows the TG of the single-walled carbon nanotubes synthesized in Example 9.
Figure 23:
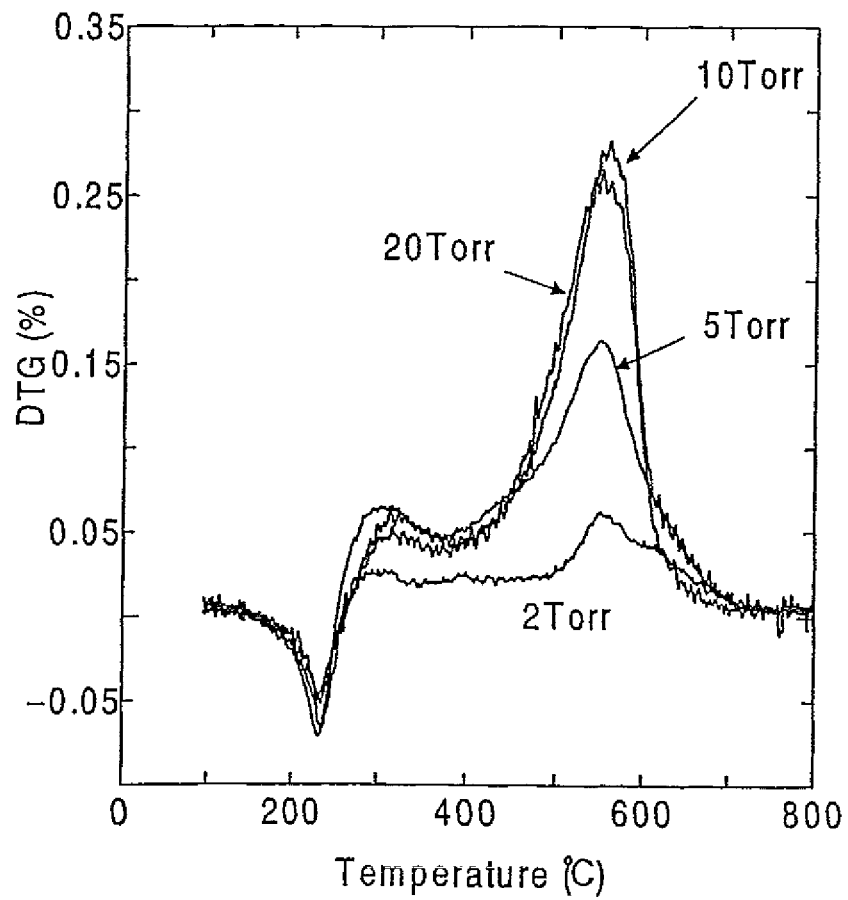
FIG. 23 shows the DTG of the single-walled carbon nanotubes synthesized in Example 9.

An experiment was carried out under the same conditions as in Example 5 except that the pressure was changed, and TGA was measured. TG is shown in FIG. 22 and DTG is shown in FIG. 23.

By increasing the ethanol pressure from 2 Torr (0.27 kPa), the yield of the single-walled carbon nanotubes increases.

TABLE 7

| | Sample | | | | | | | | | | | | | | |
|---|---|---|---|---|---|---|---|---|---|---|---|---|---|---|---|
| | A-1 | A-2 | A-3 | A-4 | A-5 | A-6 | A-7 | A-8 | A-9 | A-11 | A-12 | A-13 | A-14 | A-15 | A-16 |
| D/G | 0.33 | 0.12 | 0.06 | 0.04 | 0.03 | 0.29 | 0.08 | 0.03 | 0.07 | 0.03 | 0.05 | 0.08 | 0.29 | 0.09 | 0.09 |
| P1 | 257 | 257 | 257 | 257 | 201 | 257 | 257 | 201 | 257 | 201 | 257 | 257 | 257 | 257 | 257 |
| P2 | 242 | 242 | 242 | 201 | 257 | 242 | 242 | 257 | 242 | 257 | 201 | 242 | 242 | 242 | 242 |

Note
D/G: ratio of peak height D of D band to peak height G of G band
P1: position (unit: cm$^{-1}$) of the highest peak in RBM (150-300 cm$^{-1}$) obtained by Raman spectroscopy employing excitation wavelength of 488 nm
P2: position (unit: cm$^{-1}$) of the second highest peak in RBM (150-300 cm$^{-1}$) obtained by Raman spectroscopy employing excitation wavelength of 488 nm However, the yield reaches the plateau at 10 Torr (1.3 kPa), and the yields at 10 Torr (1.3 kPa) and 20 Torr (2.7 kPa) are about the same. This is presumably because, as described in Example 5, that the annealing time of the single-walled carbon nanotubes is insufficient because of the high pressure, and the yield cannot be increased any more.

Example 10

The catalyst in the form of pale yellow powder prepared in Example 1 was put on a quartz boat, and placed in a quartz tube in an electric furnace. During heating the inside of the electric furnace (about 30 minutes) to 800° C., the atmosphere inside the quartz tube (inner diameter: 27 mm) was replaced with an Ar atmosphere. More specifically, Ar gas was flown thereinto at a rate of 200 sccm.

After the temperature reached 800° C., Ar gas flow was changed to 600 sccm, 10 and Ar gas bubbled with ethanol (0° C.) was flown for 30 minutes keeping the temperature to change the atmosphere in the system to ethanol atmosphere. In this case, the partial pressure of ethanol was the vapor pressure thereof at 0° C. which was 12 Torr (1.6 kPa), and a flow with a flow rate of about 10 sccm was generated. Then the temperature was lowered to obtain black powder on the quartz boat.

The obtained black powder was subjected to Raman spectroscopy (excitation wavelength: 488 nm), and observed with SEM and TEM to confirm that it was single-walled CNTs with a high quality having diameters of 0.8 nm to 1.5 nm.

The position of the highest peak in the range of 150 to 300 $cm^{-1}$ in Raman spectrum measured at 633 nm was 193 $cm^{-1}$.

Example 11

The catalyst in the form of pale yellow powder prepared in Example 1 was put on a quartz boat, and placed in a quartz tube in an electric furnace. During heating the inside of the electric furnace (about 30 minutes) to 800° C., the atmosphere inside the quartz tube (inner diameter: 27 mm) was replaced with an Ar atmosphere. More specifically, Ar gas was flown thereinto at a rate of 200 sccm.

After the temperature reached 800° C., Ar gas flow was changed to 600 seem, and Ar gas bubbled with ethanol (−5° C.) was flown for 30 minutes keeping the temperature to change the atmosphere in the system to ethanol atmosphere. In this case, the partial pressure of ethanol was the vapor pressure thereof at −5° C. which was 5 to 10 Torr (0.67 to 1.3 kPa), and a flow with a flow rate of about 5 to 10 sccm was generated. Then the temperature was lowered to obtain black powder on the quartz boat.

The obtained black powder was subjected to Raman spectroscopy (excitation wavelength: 488 nm), and observed with SEM and TEM to confirm that it was single-walled carbon nanotubes with a high quality having diameters of 0.8 nm to 1.5 nm.

The position of the highest peak in the range of 150 to 300 $cm^{-1}$ in Raman spectrum measured at 633 nm was 193 $cm^{-1}$.

Example 12

The catalyst in the form of pale yellow powder prepared in Example 1 was put on a quartz boat, and placed in a quartz tube in an electric furnace. During heating the inside of the electric furnace (about 30 minutes) to 850° C., the atmosphere inside the quartz tube (inner diameter: 27 mm) was replaced with Ar+hydrogen (hydrogen: 3 v/v %) atmosphere. More specifically, Ar/hydrogen mixed gas was flown thereinto at a rate of 200 sccm.

After the temperature reached 850° C., the quartz tube was evacuated and the inside thereof was kept under an ethanol atmosphere keeping the temperature. The time for keeping the inside of the tube under ethanol atmosphere was changed such that it was 10 minutes, 60 minutes or 120 minutes. The ethanol pressure at this stage was 10 Torr (1.3 kPa), and a flow with a flow rate of 300 sccm was generated by a vacuum pump.

Figure 24:
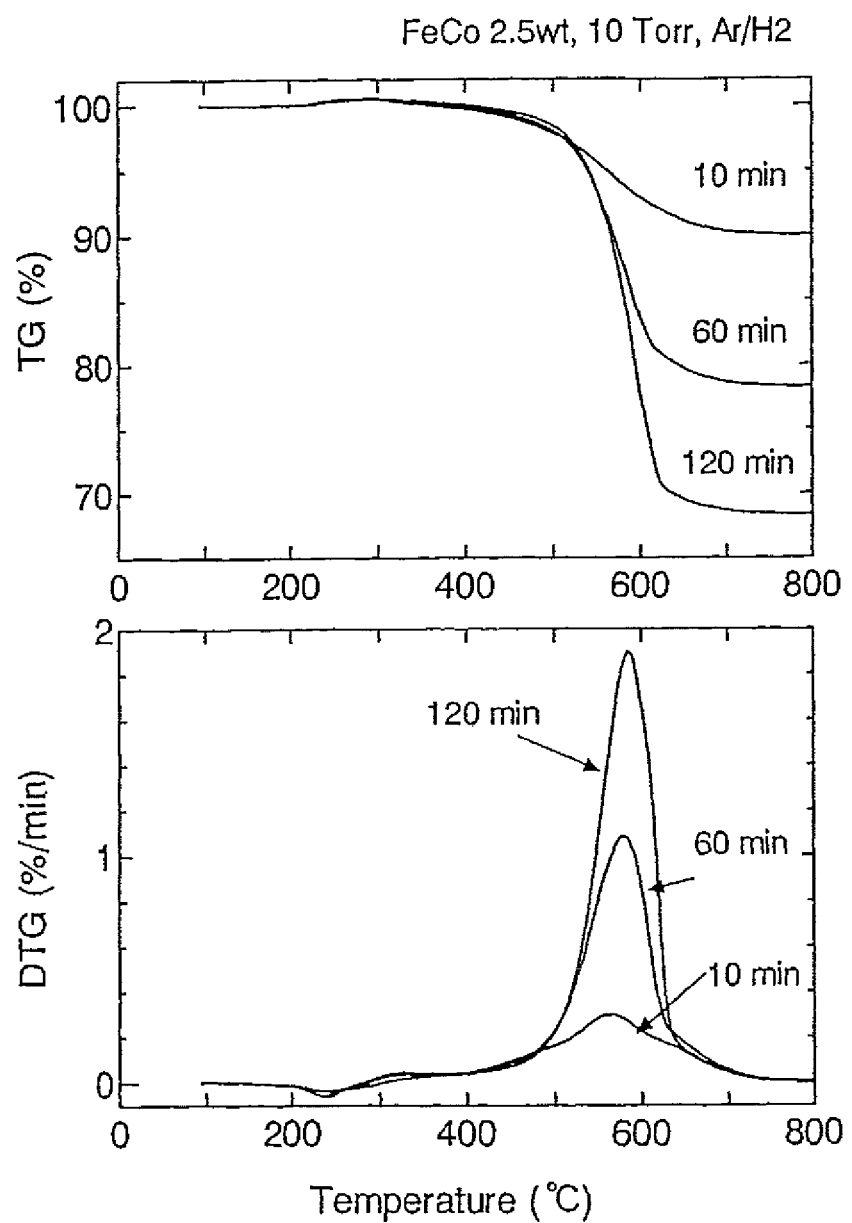
FIG. 24 shows the TG and DTG of the single-walled carbon nanotubes synthesized in Example 12.
Figure 25:
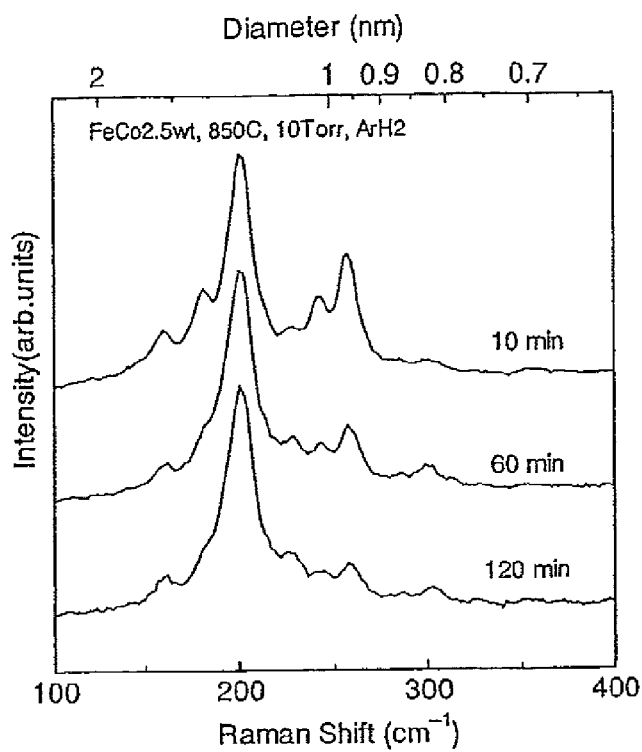
FIG. 25 shows the results of Raman spectroscopy (488 nm) of the single-walled carbon nanotubes synthesized in Example 12.
Figure 25:
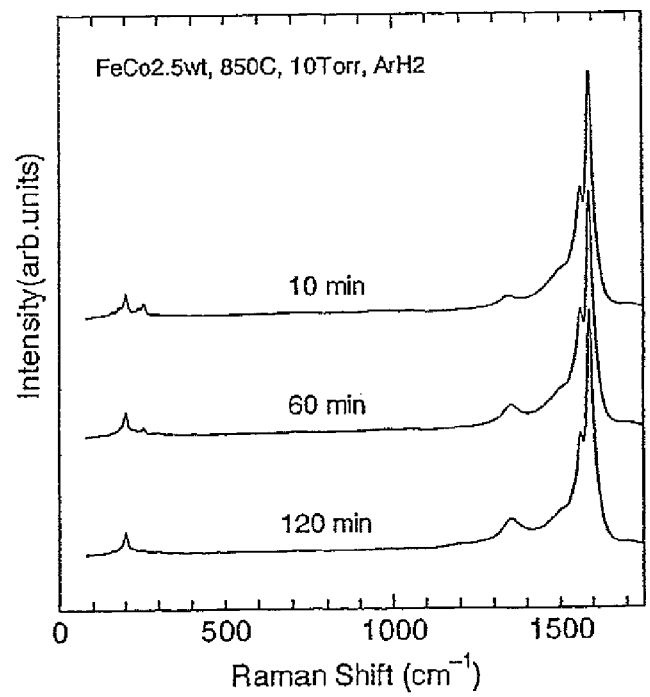

The results of TG and DTG obtained by subjecting the generated sample to a thermal analysis in the air with a heating rate of 5° C./minute are shown in FIG. 24. The peak position in the linear differential curve of weight decrease by burning was at 590° C., and the half value width was 70° C. The yield obtained from TG as in Example 7 was 32%. It can be seen that a yield of about three times that in Example 7 when the reaction time was the same was obtained.

Comparative Example 1

The single-walled carbon nanotubes (a product from which the metal catalyst has been removed) generated by HipCO process produced by CM were measured for the Raman spectrum. The maximum peak of RBM was at 202 $cm^{-1}$ when measured with an excitation wavelength of 488 nm, at 186 $cm^{-1}$ when measured with an excitation wavelength of 514 nm, and at 220 $cm^{-1}$ when measured with an excitation wavelength of 633 nm. Although a shoulder was observed in the G band in the Raman spectrum, no split was observed. The average diameter determined from the spectrum measured at 488 nm was 1.21 nm.

INDUSTRIAL AVAILABILITY

The present invention can be effectively utilized in the production of carbon nanotubes and in the field of application thereof.

What is claimed is:

1. A composition containing single-walled carbon nanotubes, the composition satisfying the conditions defined in a) to c) below;
   a) when the composition containing the single-walled carbon nanotubes is thermally analyzed at temperature rising rate of 5° C./min, a peak position of a linear differential curve of weight decrease by burning is obtained at 500° C. or higher, and the half value width of the peak is smaller than 100° C.;
   b) when the composition is observed by a transmission electron microscope of $10^6$-magnification, the single-walled carbon nanotubes are observed;
   c) when the composition containing single-walled carbon nanotubes is observed by a resonance Raman scattering measurement (an excitation wavelength is 488 nm);
   1) G band is observed in 1590±10 $cm^{-1}$ and said G band is split;
   2) a peak height in 1350±10 $cm^{-1}$ (D band) is one-third or lower of a peak height in the vicinity 1590±10 $cm^{-1}$.

2. The composition containing single-walled carbon nanotubes as claimed in claim 1, wherein a peak position of a linear differential curve of weight decrease by burning in said thermal analysis is obtained at 540° C. or higher.

3. The composition containing single-walled carbon nanotubes as claimed in claim 1, wherein a peak position of a linear differential curve of weight decrease by burning in said thermal analysis is obtained at 550° C. or higher.

4. The composition containing single-walled carbon nanotubes as claimed in claim 1, wherein a peak position of a linear differential curve of weight decrease by burning in said thermal analysis is obtained at 580° C. or higher.

5. The composition containing single-walled carbon nanotubes as claimed in claim 1, wherein a half value width of a peak on a linear differential curve of weight decrease by burning in said thermal analysis is 70° C. or lower.

6. The composition containing single-walled carbon nanotubes as claimed in claim 1, wherein a peak height in said 1350±10 cm$^{-1}$ (D band) is a tenth or lower of a peak height in 1590±10 cm$^{-1}$.

7. The composition containing single-walled carbon nanotubes as claimed in claim 1, wherein a peak height in said 1350±10 cm$^{-1}$ (D band) is a twentieth or lower of a peak height in 1590±10 cm$^{-1}$.

8. The composition containing single-walled carbon nanotubes as claimed in claim 1, wherein a maximum peak between 150 and 300 cm$^{-1}$ is present at 258±5 cm$^{-1}$ when the composition containing single-walled carbon nanotubes is observed by the resonance Raman measurement (the excitation wavelength is 488 nm).

9. The composition containing single-walled carbon nanotubes as claimed in claim 1, wherein a first maximum peak and a second maximum peak between 150 and 300 cm$^{-1}$ is obtained at the positions of 201±5 cm$^{-1}$ and 258±5 cm$^{-1}$, respectively, when the composition containing single-walled carbon nanotubes is observed by the resonance Raman measurement (the excitation wavelength is 488 nm).

10. The composition containing single-walled carbon nanotubes as claimed in claim 1, wherein a maximum peak between 150 and 300 cm$^{-1}$ is present at the position of 193±5 cm$^{-1}$ when the composition containing single-walled carbon nanotubes is observed by a resonance Raman measurement (the excitation wavelength is 633 nm).

11. The composition containing single-walled carbon nanotubes as claimed claim 1, wherein a maximum peak between 150 and 300 cm$^{-1}$ is present at the position of 280±5 cm$^{-1}$ when the composition containing single-walled carbon nanotubes is observed by a resonance Raman measurement (the excitation wavelength is 633 nm).

12. The composition containing single-walled carbon nanotubes as claimed in claim 1, wherein an average diameter of the single-walled carbon nanotubes is 1.2 nm or less when the composition containing carbon nanotubes is measured by the resonance Raman scattering measurement (the excitation wavelength is 488 nm).

13. The composition containing single-walled carbon nanotubes as claimed in claim 1, wherein an average diameter of the single-walled carbon nanotubes is 1.1 nm or less when the composition containing carbon nanotubes is measured by the resonance Raman scattering measurement (the excitation wavelength is 488 nm).

14. The composition containing single-walled carbon nanotubes as claimed in claim 1, wherein an average diameter of the single-walled carbon nanotubes is 1.0 nm or less when the composition containing carbon nanotubes is measured by the resonance Raman scattering measurement (the excitation wavelength is 488 nm).

15. The composition containing single-walled carbon nanotubes as claimed in claim 1, wherein at least 30% of a 100 nm square viewing area is occupied by carbon nanotubes and the carbon nanotubes of 95% or more of the carbon nanotubes are the single-walled carbon nanotubes when the composition containing carbon nanotubes is observed by the transmission electron microscope of 10$^6$-magnification.

16. The composition containing single-walled carbon nanotubes as claimed in claim 1, wherein the single-walled carbon nanotubes are produced by a process in which a carbon source comprising an organic compound containing oxygen in a molecule thereof is brought into contact with a catalyst.

17. The composition containing single-walled carbon nanotubes as claimed in claim 16, wherein the organic compound containing oxygen in a molecule thereof is selected from the group consisting of alcohols and ethers.

* * * * *